US012007785B2

(12) United States Patent
    Hong et al.

(10) Patent No.: US 12,007,785 B2
(45) Date of Patent: Jun. 11, 2024

(54) CLEANING ROBOT CAPABLE OF OBTAINING MAP OF INDOOR SPACE AND OPERATING METHOD THEREOF

(71) Applicant: Samsung Electronics Co., Ltd., Suwon-si (KR)

(72) Inventors: Junu Hong, Suwon-si (KR); Injoo Kim, Suwon-si (KR); Sukhoon Song, Suwon-si (KR); Kyongsu Kim, Suwon-si (KR); Hankyeol Kim, Suwon-si (KR); Dongmin Shin, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/570,855

(22) Filed: Jan. 7, 2022

(65) Prior Publication Data

US 2023/0061444 A1 Mar. 2, 2023

Related U.S. Application Data

(63) Continuation of application No. PCT/KR2021/019844, filed on Dec. 24, 2021.

(30) Foreign Application Priority Data

Aug. 31, 2021 (KR) .................. 10-2021-0115804

(51) Int. Cl.
    *G05D 1/00* (2006.01)
(52) U.S. Cl.
    CPC ......... *G05D 1/0274* (2013.01); *G05D 1/0246* (2013.01)
(58) Field of Classification Search
    CPC .. G05D 1/0274; G05D 1/0246; G05D 1/0248; G05D 2201/0203; G05D 2201/0207
    See application file for complete search history.

(56) References Cited

U.S. PATENT DOCUMENTS

| 8,880,271 | B2 | 11/2014 | Jeon |
| 2012/0259481 | A1 | 10/2012 | Kim |

(Continued)

FOREIGN PATENT DOCUMENTS

| JP | 2019023893 A | 2/2019 |
| JP | 2020533720 A | 11/2020 |

(Continued)

OTHER PUBLICATIONS

International Search Report and Written Opinion for International Application No. PCT/KR2021/019844; International Filing Date Dec. 24, 2021; dated May 13, 2022; 11 Pages.

(Continued)

*Primary Examiner* — Khoi H Tran
*Assistant Examiner* — Nhi Q Bui
(74) *Attorney, Agent, or Firm* — CANTOR COLBURN LLP

(57) ABSTRACT

Provided are a cleaning robot for obtaining a map of an indoor space, and an operating method thereof. The cleaning robot may: search the indoor space at a first location of the cleaning robot by using at least one sensor; obtain a grid map including a searched area, which has been searched at the first location, and at least one unsearched area, which has not been searched at the first location; determine, as a travel destination, a first unsearched area among the at least one unsearched area based at least in part on a distance from the first location; obtain area information including at least one of geometry information, structure information, or obstacle information about the first unsearched area while moving the cleaning robot to the determined first unsearched area; and update the grid map by using the obtained area information.

19 Claims, 16 Drawing Sheets

(56) References Cited

U.S. PATENT DOCUMENTS

| | | |
|---|---|---|
| 2016/0334800 A1 | 11/2016 | Han et al. |
| 2018/0059685 A1* | 3/2018 | Baroudi .................. G05D 1/028 |
| 2018/0333853 A1* | 11/2018 | Cousins ............... G05D 1/0276 |
| 2019/0202056 A1* | 7/2019 | Xiong .................... B25J 9/1666 |
| 2019/0212730 A1* | 7/2019 | Jones .................... G05D 1/0274 |
| 2020/0041295 A1* | 2/2020 | Stewart .............. G01C 21/3492 |
| 2021/0003405 A1 | 1/2021 | Choi |
| 2021/0004015 A1* | 1/2021 | Choi .................... G01S 17/931 |
| 2021/0018929 A1* | 1/2021 | Choi .................... G05D 1/0274 |
| 2021/0131822 A1 | 5/2021 | Artes et al. |
| 2022/0074762 A1* | 3/2022 | Artes ..................... B25J 9/0003 |

FOREIGN PATENT DOCUMENTS

| | | | |
|---|---|---|---|
| KR | 101104225 B1 | | 1/2012 |
| KR | 101395888 B1 | | 5/2014 |
| KR | 101525071 B1 | | 6/2015 |
| KR | 20160057369 A | * | 5/2016 |
| KR | 20160059473 A | | 5/2016 |
| KR | 20190119234 A | | 10/2019 |
| KR | 20200034011 A | * | 3/2020 |
| KR | 1020200100019 A | | 8/2020 |
| KR | 20210009011 A | | 1/2021 |
| KR | 1020210004674 A | | 1/2021 |
| KR | 1020210072304 A | | 6/2021 |

OTHER PUBLICATIONS

Samsung Electronics Co., Ltd.; "Samsung Jet Bot TM AI + robot vacuum with built-in Clean Station TM"; Bespoke Jetbot AI; Jan. 11, 2021; Accessed Online: Aug. 16, 2022; <URL: https://www.samsung.com/sec/vacuum-cleaners/jetbot-vr50195935w/VR50T95935N>; 23 Pages.

Samsung Newsroom; Samsung Electronics unveils 'Jetbot AI', a robot vacuum cleaner equipped with AI solution at CES 2021; Jan. 11, 2021; Accessed Online: Aug. 16, 2022; 4 Pages. URL: https://news.samsung.com/kr/삼성 전자-ces-2021 서-ai 솔루션-탑재한-로봇 청소기-제트봇--ai>.

* cited by examiner

FIG. 1
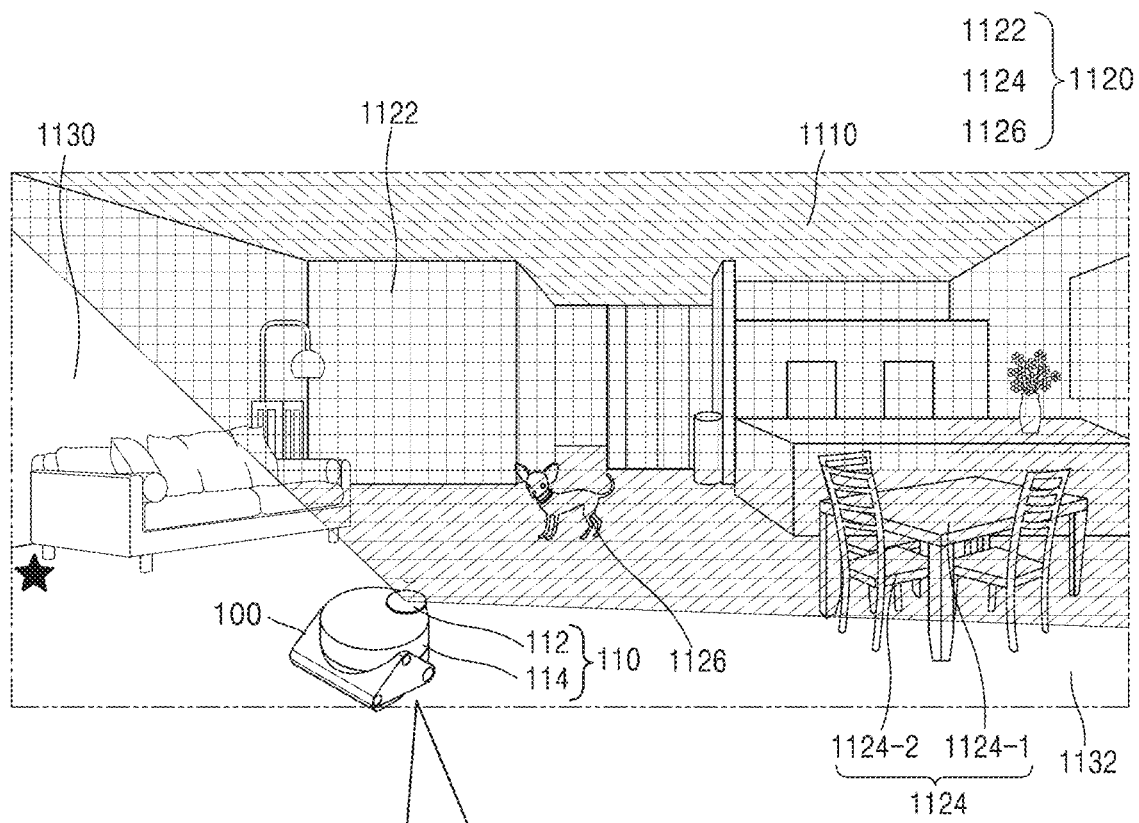
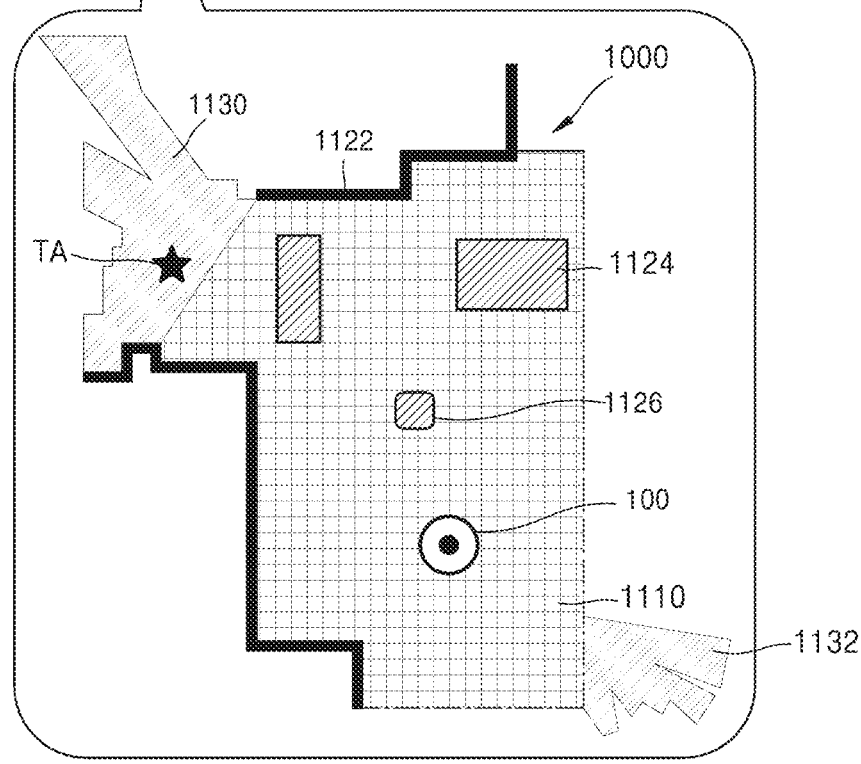

MOVING PATH : $P_0 \rightarrow P_1 \rightarrow P_2 \rightarrow P_3 \rightarrow P_4 \rightarrow \cdots \rightarrow P_n$
POINT AT WHICH ADDITIONAL UNSEARCHED AREA IS DETECTED : $P_{n-m}$
 $m : 0, 1, 2, \ldots, (n-1)$ FIG. 13
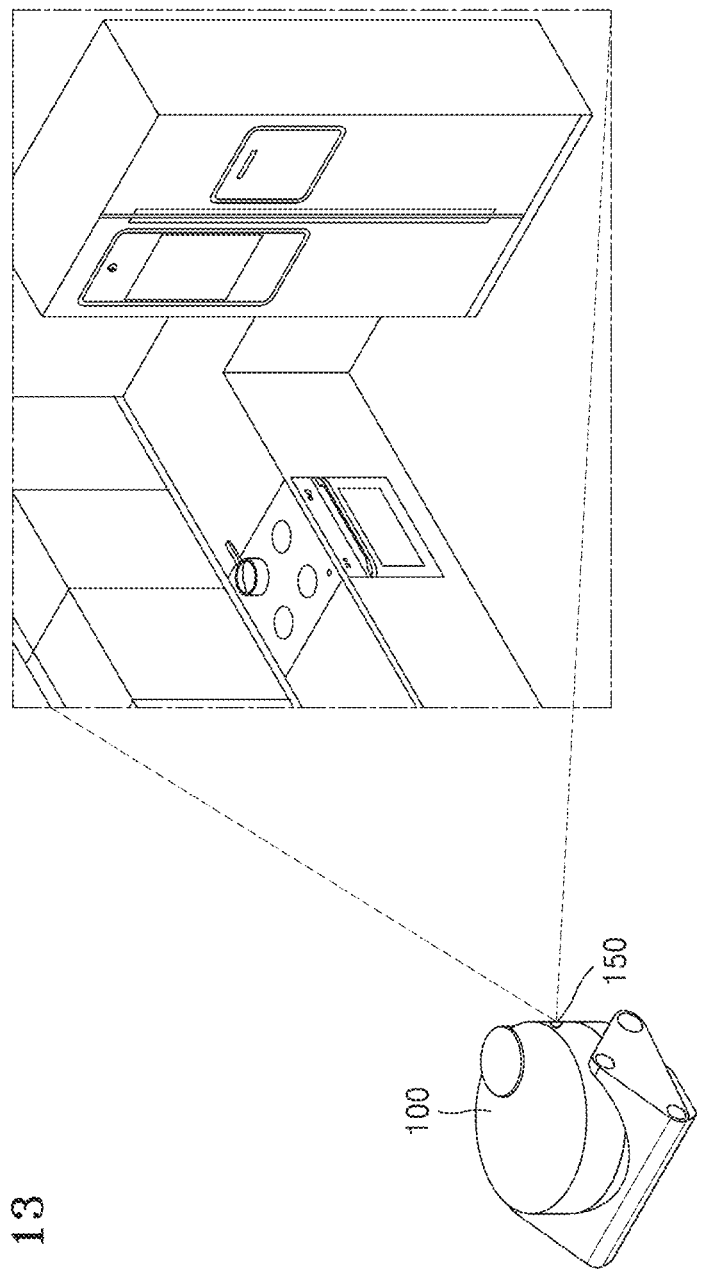
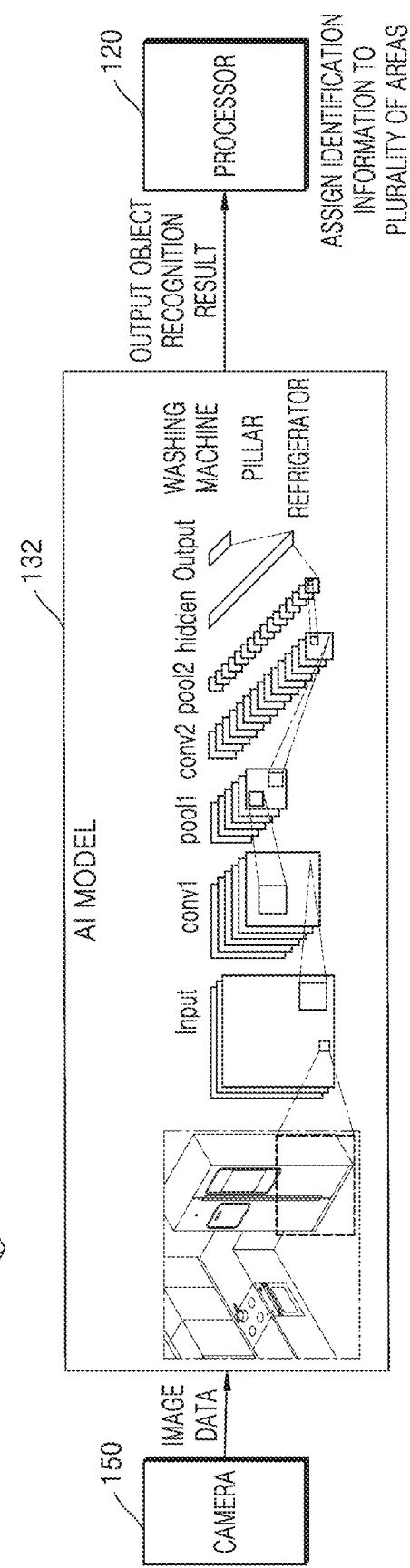

CLEANING ROBOT CAPABLE OF OBTAINING MAP OF INDOOR SPACE AND OPERATING METHOD THEREOF

This application is a PCT-Bypass of International Application No. PCT/KR2021/019844, filed on Dec. 24, 2021, which claims priority to Korean Patent Application No. 10-2021-0115804, filed on Aug. 31, 2021, and all the benefits accruing therefrom under 35 U.S.C. § 119, the content of which in its entirety is herein incorporated by reference

TECHNICAL FIELD

The disclosure relates to a cleaning robot capable of obtaining a map of an indoor space, and an operating method thereof. Particularly, the disclosure relates to a cleaning robot capable of obtaining a map indicating a structure of an indoor space and obstacle information for performing a cleaning operation on the indoor space, and an operating method of the cleaning robot.

BACKGROUND ART

A cleaning robot is an electronic device that cleans an area in an indoor space by sucking up dust or foreign substances while traveling through the area by itself. In order for the cleaning robot to perform a set operation, such as cleaning, a map indicating the structure of the indoor space or obstacles within the indoor space needs to be generated. As a method, performed by a cleaning robot, of generating a map of an indoor space, a vision mapping scheme can be used. A vision mapping scheme is for obtaining information about a structure of an indoor space and obstacles by detecting the obstacles by using a proximity sensor while traveling through the indoor space in a zigzag traveling pattern or traveling through a certain area at random.

Existing schemes, such as a vision mapping scheme, are disadvantageous in that it takes a lot of time to obtain a map of an indoor space because the entire indoor space needs to be traveled through to obtain the map of the indoor space, and only obstacles adjacent to a travel path are detectable by using a proximity sensor.

DESCRIPTION OF EMBODIMENTS

Technical Problem

Various embodiments of the disclosure are to provide a cleaning robot capable of effectively obtaining a map of an indoor space within a short time without traveling through all areas of the indoor space, and an operating method of the cleaning robot. According to an embodiment of the disclosure, provided are a cleaning robot capable of obtaining a map of an indoor space by searching the indoor space using a sensor to obtain a grid map, detecting an unsearched area adjacent to the location of the cleaning robot on the grid map, obtaining information about the unsearched area while moving the cleaning robot to the unsearched area, and updating the map by using the obtained information, and an operating method thereof.

Technical Solution to Problem

According to an embodiment of the disclosure, provided is a method, performed by a cleaning robot, of obtaining a map of an indoor space. The method may include searching the indoor space at a first location of the cleaning robot by using at least one sensor of the cleaning robot, obtaining a grid map including a searched area, which has been searched at the first location, and at least one unsearched area, which has not been searched at the first location, determining, as a travel destination, based at least in part on a distance from the first location, a first unsearched area among the at least one unsearched area, the first unsearched area having not been searched at the first location, obtaining area information including at least one of geometry information, structure information, or obstacle information about the first unsearched area while moving the cleaning robot from the first location to the first unsearched area, and updating the grid map by using the obtained area information.

In an embodiment of the disclosure, the determining of the first unsearched area as the travel destination may include detecting the first unsearched area by performing an analysis using a breadth-first search scheme in four directions or eight directions based on the first location on the grid map.

In an embodiment of the disclosure, the determining of the first unsearched area as the travel destination may include comparing a distance between a plurality of obstacles around a location of the first unsearched area with a width of the cleaning robot, and determining, when the distance between the obstacles is greater than the width of the cleaning robot based on a result of the comparing, the first unsearched area as the travel destination.

In an embodiment of the disclosure, the method may further include determining a moving path for moving the cleaning robot from the first location to a location of the first unsearched area.

In an embodiment of the disclosure, the method may further include obtaining information about at least one via point, which is passed through in moving the cleaning robot along the moving path, and optimizing the moving path by merging or deleting the at least one via point based on a shortest distance between the first location and the location of the first unsearched area and location information of an obstacle adjacent to a line indicating the shortest distance.

In an embodiment of the disclosure, the method may further include, after moving the cleaning robot to the first unsearched area, detecting, as a second travel destination, a second unsearched area among at least one unsearched area included in the updated grid map by analyzing a surrounding area based on a location of the first unsearched area on the updated grid map.

In an embodiment of the disclosure, the updating of the grid map may include moving the cleaning robot to a second location, which is at one via point among a plurality of via points included in a moving path for moving the cleaning robot to a location of the first unsearched area, updating the grid map based on information obtained while moving the cleaning robot to the second location, and determining a second unsearched area as a second travel destination by analyzing a surrounding area based on the second location on the updated grid map.

In an embodiment of the disclosure, the method may further include storing the updated grid map in a memory.

In an embodiment of the disclosure, the storing of the grid map may include, when the cleaning robot approaches a charging station within a preset threshold distance, storing the updated grid map.

In an embodiment of the disclosure, the method may further include dividing the updated grid map into a plurality of areas, and assigning identification information about the plurality of areas based on at least one of a type of an object recognized in the plurality of areas or dimensions of the plurality of areas.

According to another embodiment of the disclosure, provided is a cleaning robot for obtaining a map of an indoor space. The cleaning robot may include a sensor module including at least one of a light detection and ranging sensor or an obstacle detection sensor, a moving assembly configured to move the cleaning robot, a memory which stores at least one instruction, and at least one processor configured to execute the at least one instruction to search the indoor space at a first location of the cleaning robot by using the sensor module, obtain a grid map including a searched area, which has been searched at the first location, and at least one unsearched area, which has not been searched at the first location, determine, as a travel destination, based at least in part on a distance from the first location, a first unsearched area among the at least one unsearched area, the first unsearched area having not been searched at the first location, control the moving assembly to move the cleaning robot toward the first unsearched area, obtain area information including at least one of location information, structure information, or obstacle information about the first unsearched area, and update the grid map by using the obtained area information.

In an embodiment of the disclosure, the at least one processor may control the sensor module to perform an analysis using a breadth-first search scheme in four directions or eight directions based on the first location, and detect the first unsearched area which has not been searched by the sensor module.

In an embodiment of the disclosure, the at least one processor may compare a distance between a plurality of obstacles around a location of the first unsearched area with a width of the cleaning robot, determine, when the distance between the obstacles is greater than the width of the cleaning robot based on a result of the comparing, the first unsearched area as the travel destination, and control the moving assembly to move the cleaning robot to the determined first travel destination.

In an embodiment of the disclosure, the at least one processor may determine a moving path for moving the cleaning robot from the first location to a location of the first unsearched area.

In an embodiment of the disclosure, the at least one processor may obtain information about at least one via point, which is passed through in moving the cleaning robot along the moving path, and optimize the moving path by merging or deleting the at least one via point based on a shortest distance between the first location and the location of the first unsearched area and location information of an obstacle adjacent to a line indicating the shortest distance.

In an embodiment of the disclosure, the at least one processor may, after moving the cleaning robot to the first unsearched area, detect a second unsearched area among at least one unsearched area included in the updated grid map by analyzing a surrounding area based on a location of the first unsearched area on the updated grid map.

In an embodiment of the disclosure, the at least one processor may control the moving assembly to move the cleaning robot to a second location, which is any one via point among a plurality of via points included in a moving path for moving to a location of the first unsearched area, update the grid map based on information obtained while moving the cleaning robot to the second location, and detect a second unsearched area by searching a surrounding area based on the second location on the updated grid map by using the sensor module.

In an embodiment of the disclosure, the at least one processor may store the updated grid map in the memory.

In an embodiment of the disclosure, the at least one processor may, when the cleaning robot approaches a charging station within a preset threshold distance, store the updated grid map.

According to another embodiment of the disclosure, provided is a computer program product including a computer-readable recording medium. The computer-readable recording medium includes instructions which are readable by at least one processor of a cleaning robot to cause the cleaning robot to search an indoor space at a first location of the cleaning robot by using at least one sensor of the cleaning robot, obtain a grid map including a searched area, which has been searched at the first location, and at least one unsearched area, which has not been searched at the first location, determine, as a travel destination, based at least in part on a distance from the first location, a first unsearched area among the at least one unsearched area, the first unsearched area having not been searched at the first location, obtain area information including at least one of geometry information, structure information, or obstacle information about the first unsearched area while moving the cleaning robot from the first location to the first unsearched area, and update the grid map by using the obtained area information.

BRIEF DESCRIPTION OF DRAWINGS

The disclosure may be readily understood with a combination of the following detailed descriptions and the accompanying drawings, wherein reference numbers refer to structural elements.

FIG. 1 is a diagram illustrating an operation, performed by a cleaning robot, of searching an indoor space by using a sensor, according to an embodiment of the disclosure.

FIG. 13 is a diagram illustrating an operation, performed by a cleaning robot, of recognizing an object in an indoor space, according to an embodiment of the disclosure.

MODE OF DISCLOSURE

Figure 2:
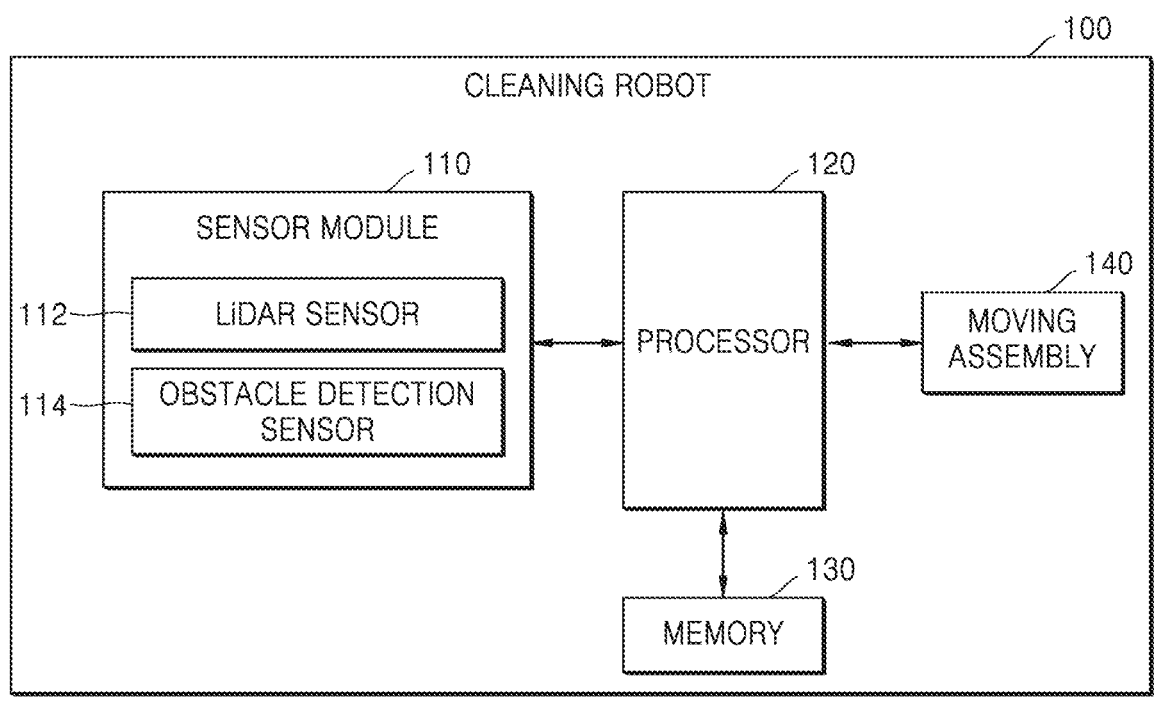
FIG. 2 is a block diagram illustrating components of a cleaning robot, according to an embodiment of the disclosure.

Throughout the disclosure, the expression "at least one of a, b or c" indicates only a, only b, only c, both a and b, both a and c, both b and c, all of a, b, and c, or variations thereof.

Although the terms used in the specification are selected from among common terms that are currently widely used in consideration of their function in the disclosure, the terms may be different according to an intention of one of ordinary skill in the art, a precedent, or the advent of new technology. Also, in particular cases, the terms are discretionally selected by the applicant of the disclosure, in which case, the meaning of those terms will be described in detail in the corresponding part of the detailed description. Therefore, the terms used in the disclosure are not merely designations of the terms, but the terms are defined based on the meaning of the terms and content throughout the disclosure.

The singular expression also includes the plural meaning as long as it does not inconsistent with the context. All terms, including technical and scientific terms, used herein have the same meaning as commonly understood by one of skill in the art to which the disclosure pertains based on an understanding of the disclosure.

Throughout the disclosure, when an element "includes" an element, unless there is a particular description contrary thereto, the element may further include other elements, not excluding the other elements. Also, the terms described in the specification, such as " . . . er (or)", " . . . unit", " . . . module", etc., denote a unit that performs at least one function or operation, which may be implemented as hardware or software or a combination thereof.

The expression "configured to", as used herein, may be interchangeably used with, for example, "suitable for", "having the capacity to", "designed to", "adapted to", "made to", or "capable of" according to a situation. The term "configured to" may not imply only "specially designed to" in a hardware manner. Instead, in a certain situation, an expressed statement of "a system configured to" may imply that the system is "capable of" performing together with other devices or components. For example, "a processor configured to perform A, B, and C" may imply a dedicated processor (e.g., an embedded processor) for performing a corresponding operation or a generic-purpose processor (e.g., central processing unit (CPU) or an application processor) capable of performing corresponding operations by executing one or more software programs stored in a memory.

Also, in the disclosure, it should be understood that when elements are "connected" or "coupled" to each other, the elements may be directly connected or coupled to each other, but may alternatively be connected or coupled to each other with an intervening element therebetween, unless specified otherwise.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Hereinafter, embodiments of the disclosure will be described in detail with reference to the accompanying drawings such that those of skill in the art may easily carry out the disclosure. The disclosure may, however, be embodied in many different forms and should not be construed as being limited to the embodiments of the disclosure set forth herein.

Hereinafter, embodiments of the disclosure will be described in detail with reference to the drawings.

FIG. 1 is a diagram illustrating an operation, performed by a cleaning robot 100, of searching an indoor space by using a sensor, according to an embodiment of the disclosure.

Referring to FIG. 1, the cleaning robot 100 is a robotic device capable of moving by itself by using a driving motor, wheels, and the like, and may perform a cleaning operation while moving in the indoor space. The 'indoor space' may refer to an area in which the cleaning robot 100 may move substantially freely. The indoor space may be, for example, an interior space of a house, an apartment, an office, a restaurant, a store, or other such space.

The cleaning robot 100 may include a sensor module 110. The cleaning robot 100 may search the indoor space by using the sensor module 110, and generate a map of the indoor space.

The sensor module 110 may include a light detection and ranging (LiDAR) sensor 112 and an obstacle detection sensor 114, but is not limited thereto. In an embodiment of the disclosure, the cleaning robot 100 may search the indoor space by using the LiDAR sensor 112, and generate the map of the indoor space by detecting a structure of the indoor space and an obstacle. The LiDAR sensor 112 is a sensor configured to obtain information about the distance, location, direction, material, and the like of an object or obstacle in the indoor space, by emitting a laser to the indoor space and analyzing a time taken for the laser to be reflected from the object or obstacle, and a signal strength. The cleaning robot 100 may search the indoor space by using the LiDAR sensor 112 to obtain geometry information about the location and structure of a wall, an object, or an obstacle in the indoor space.

The cleaning robot 100 may detect an object or obstacle in the indoor space by using the obstacle detection sensor 114. The obstacle detection sensor 114 is a sensor for detecting the distance from a wall or an obstacle in the indoor space, and may be configured with at least one of, for example, an ultrasonic sensor, an infrared sensor, a red-green-blue-depth (RGB-D) sensor, a bumper sensor, a radio frequency (RF) sensor, or a position-sensitive device (PSD) sensor.

The cleaning robot 100 may generate the map of the indoor space by using geometry information about the distance, location, and direction of the wall, the object, or the obstacle detected by the sensor module 110. In an embodiment of the disclosure, the map of the indoor space may be a grid map 1000. The grid map 1000 is a map in which a space having a preset size is divided and expressed into cell units.

The grid map 1000 may include searched areas 1110 and 1120 (hereinafter, also referred to as the first and second areas 1110 and 1120), which have been searched by the cleaning robot 100 by using the sensor module 110, and one or more unsearched areas 1130 and 1132 (hereinafter, also referred to as the first and second unsearched areas 1130 and 1132), which have not been searched by the cleaning robot by using the sensor module 110. The searched areas 1110 and 1120 may include, as a result of the search using the sensor module 110, the first area 1110, which is a free space in which no object or obstacle has been detected, and the second area 1120 in which an obstacle has been detected. On the grid map 1000, the first area 1110 may be indicated by a lattice pattern, and the second area 1120 may be indicated in black (without a pattern) or may be otherwise shaded. The second area 1120 may be, for example, an area in which an object or obstacle, such as a wall 1122, furniture 1124, or a pet 1126 in the indoor space, has been detected.

For purposes of rapidly generating the grid map 1000, the cleaning robot 100 may group multiple items in close physical proximity together as a single obstacle. For example, a table 1124-1 and one or more chairs 1124-2 in close proximity to or positioned partially under the table 1124-1 may be grouped as a single obstacle of furniture 1124. Subsequent analysis performed by the cleaning robot 100 may include identifying legs of the table 1124-1 and legs of the one or more chairs 1124-2 to determine a cleaning path beneath the table 1124-1 and the one or more chairs 1124-2. The sensor module 110 may also determine a clearance margin above the cleaning robot 100 and beneath the table 1124-1 and the one or more chairs 1124-2 to confirm that the cleaning robot 100 can successfully travel beneath the table 1124-1 and the one or more chairs 1124-2. Further, the cleaning robot 100 can also determine a cleaning path between legs of the table 1124-1 and legs of the one or more chairs 1124-2 in view of one or more dimensions of the cleaning robot 100.

The cleaning robot 100 may determine, as a travel destination TA, any one of the one or more unsearched areas 1130 and 1132 based at least in part on the distance between the location of the cleaning robot 100 and the one or more unsearched areas 1130 and 1132, which are not detected by the sensor module 110. In an embodiment of the disclosure, the cleaning robot 100 may perform analysis by applying a breadth-first search (BFS) scheme in four directions or eight directions based on the current location of the cleaning robot 100 on the grid map 1000, and determine, as the travel destination TA, the unsearched area closest to the location of the cleaning robot 100, among the one or more unsearched areas 1130 and 1132.

The cleaning robot 100 may obtain area information about at least one of a location, a structure, or an obstacle with respect to the unsearched area while moving to the travel destination TA. The cleaning robot 100 may update the grid map 1000 by using the area information obtained with respect to the unsearched area. In an embodiment of the disclosure, after moving to the travel destination TA, the cleaning robot 100 may again detect a new unsearched area based on the location of the travel destination TA, and move to the detected new unsearched area to obtain information about the new unsearched area.

The cleaning robot 100 may update the grid map 1000 by using information obtained with respect to the one or more unsearched areas 1130 and 1132 in the indoor space. The cleaning robot 100 may store the updated grid map 1000 in a memory 130 (see FIG. 2) in the cleaning robot 100 or in a separate storage device.

For example, when the cleaning robot 100 determines the first unsearched area 1130 as the travel destination TA, the cleaning robot may move to the first unsearched area 1130, then search the first unsearched area 1130 to obtain information about the first unsearched area 1130, and update the grid map 1000 by using the obtained information. Thereafter, the cleaning robot 100 may determine the second unsearched area 1132 as a new travel destination, move to the second unsearched area 1132 and obtain information about the second unsearched area 1132, and update the grid map 1000 by using the obtained information.

In the case of an existing general cleaning robot, a vision mapping scheme is mainly used to generate a map of an indoor space. The vision mapping scheme is for obtaining information about a structure of the indoor space and obstacles by detecting the obstacles using a proximity sensor while traveling through the indoor space in a zigzag traveling pattern or traveling through a certain area at random. In order to obtain the map of the indoor space by using the vision mapping scheme, the entire indoor space needs to be traveled through, and only obstacle adjacent to a travel path are detectable by using a proximity sensor, and thus it takes a lot of time to generate the map.

The cleaning robot 100, according to an embodiment of the disclosure, may search the indoor space by further using the LiDAR sensor 112 in addition to the obstacle detection sensor 114, and thus is able to search a larger space at a current location than a general cleaning robot does. The cleaning robot 100 may generate the grid map 1000 including the searched areas 1110 and 1120 and the one or more unsearched areas 1130 and 1132 based on a result of searching the indoor space by further using the LiDAR sensor 112, and determine the travel destination TA on the grid map 1000 from among the one or more unsearched areas 1130 and 1132. When the travel destination TA has been determined, the cleaning robot 100 may obtain information about the unsearched area while moving to the travel destination TA, and update the grid map 1000 by using the obtained information, so as to efficiently obtain the map of the indoor space. The cleaning robot 100, according to an embodiment of the disclosure, may obtain the map of the indoor space without traveling through the entire indoor space, and thus, may provide a technical effect of reducing the time required for obtaining the map, compared to an existing method of generating a map by traveling through a certain area in a zigzag manner or at random.

FIG. 2 is a block diagram illustrating components of the cleaning robot 100, according to an embodiment of the disclosure.

Referring to FIG. 2, the cleaning robot 100 may include the sensor module 110, a processor 120, the memory 130, and a moving assembly 140. The sensor module 110, the processor 120, the memory 130, and the moving assembly 140 may be electrically and/or physically connected to each other.

The components illustrated in FIG. 2 are only those according to an embodiment of the disclosure, and the components included in the cleaning robot 100 are not limited to those illustrated in FIG. 2. The cleaning robot 100 may not include some of the components illustrated in FIG. 2, and may further include components not illustrated in FIG. 2. For example, the cleaning robot 100 may further include a power module configured to supply driving power to the sensor module 110, the processor 120, the memory 130, and the moving assembly 140. The power module may include a battery, a power driving circuit, a converter, and a transformer circuit.

The sensor module 110 may detect a structure of an indoor space or an obstacle. The sensor module 110 may be used to generate a map of an indoor space. The sensor module 110 may include the LiDAR sensor 112 and the obstacle detection sensor 114.

The LiDAR sensor 112 is a sensor configured to output a laser and obtain geometry information including at least one of the distance, location, direction, or material of an object that has reflected the output laser. In an embodiment of the disclosure, the LiDAR sensor 112 may obtain information about the distance, location, direction, material, and the like of an object or obstacle, by emitting a laser to the indoor space, analyzing a laser reception pattern including a time taken for the laser to be reflected and returned from the object or obstacle in the indoor space, and a signal strength. In an embodiment of the disclosure, the LiDAR sensor 112 may obtain geometry information about the indoor space while rotating by 360°. The LiDAR sensor 112 may obtain geometry information about an area within a range that may be detected by the sensor. For example, the LiDAR sensor 112 may obtain geometry information about an area within a radius of 6 m from the current location of the LiDAR sensor 112. The LiDAR sensor 112 may provide the obtained geometry information to the processor 120.

The obstacle detection sensor 114 is a sensor configured to detect an obstacle in the surrounding area of the cleaning robot 100. The obstacle detection sensor 114 may detect an obstacle in the front, rear, sides, or moving path of the cleaning robot 100, for example, a wall surface, a wall edge, a protrusion, furniture, a home appliance, or a pet in the indoor space. In an embodiment of the disclosure, the obstacle detection sensor 114 may include at least one of an ultrasonic sensor, an infrared sensor, an RGB-D sensor, a bumper sensor, an RF sensor, a geomagnetic sensor, or a PSD sensor. The obstacle detection sensor 114 may provide the processor 120 with information about an obstacle detected in the indoor space.

Although not illustrated in FIG. 2, the sensor module 110 may further include at least one of a fall prevention sensor, an image sensor, or a three-dimensional (3D) sensor.

The processor 120 may execute one or more instructions of a program stored in the memory 130. The processor 120 may include a hardware component that performs arithmetic operations, logic operations, input/output operations, and signal processing. For example, the processor 120 may include at least one of a CPU, a microprocessor, a graphics processing unit (GPU), an application-specific integrated circuit (ASIC), a digital signal processor (DSP), a digital signal processing device (DSPD), a programmable logic device (PLD), or a field programmable gate array (FPGA), but is not limited thereto.

The processor 120 is illustrated as one element in FIG. 2, but is not limited thereto. In an embodiment of the disclosure, one or more processors 120 may be provided.

In an embodiment of the disclosure, the processor 120 may include an artificial intelligence (AI) processor that performs AI learning. In this case, the AI processor may recognize the type of an object or obstacle in the indoor space by using a trained network model of an AI system. The AI processor may be manufactured in the form of a dedicated hardware chip for AI, or may be manufactured as part of an existing general-purpose processor (e.g., a CPU or an application processor) or a dedicated graphics processor (e.g., a GPU), and mounted on or within the cleaning robot 100.

The memory 130 may store instructions for generating a map of an indoor space. In an embodiment of the disclosure, the memory 130 may store instructions and program code which are readable by the processor 120. In the following embodiments of the disclosure, the processor 120 may be implemented by executing the instructions or the program code stored in the memory 130.

The memory 130 may include, for example, at least one of a flash memory-type storage medium, a hard disk-type storage medium, a multimedia card micro-type storage medium, a card-type memory (e.g., a secure digital (SD) or extreme digital (XD) memory), random access memory (RAM), static random-access memory (SRAM), read-only memory (ROM), electrically erasable programmable read-only memory (EEPROM), programmable read-only memory (PROM), a magnetic memory, a magnetic disc, or an optical disc. In an embodiment of the disclosure, the cleaning robot 100 may operate a web storage or a cloud server that is accessible via a network and performs a storage function. Accordingly, the cleaning robot 100 can include a communication interface to communicate (e.g., wirelessly) with one or more other components.

The processor 120 may implement the following embodiments by executing the instructions or the program code stored in the memory 130.

The processor 120 may use the sensor module 110 to search the indoor space based on a first location, which is the current location of the cleaning robot 100. The processor 120 may obtain, from the LiDAR sensor 112, geometry information about the distance, location, and direction of a free space, a wall, an object, or an obstacle detected in the indoor space. In an embodiment of the disclosure, the processor 120 may obtain, from the obstacle detection sensor 114, information about an obstacle in the indoor space, for example, a protrusion, furniture, a home appliance, or a pet.

The processor 120 may obtain a grid map of the indoor space by using sensing information obtained by using the sensor module 110. In an embodiment of the disclosure, the processor 120 may generate the grid map by using the geometry information. The 'grid map' is a map in which the indoor space is represented by a plurality of grids or cells (hereinafter, referred to as 'cells') each having a preset size, and the presence or absence of an obstacle is indicated in each of the plurality of cells, based on the geometry information detected by the LiDAR sensor 112 and the obstacle detection sensor 114. The size of each of the plurality of cells may be, for example, 40 mm×40 mm, i.e., a length of 40 mm and a width of 40 mm, but is not limited thereto.

The processor 120 may identify the location of the cleaning robot 100 on the grid map by using simultaneous localization and mapping (SLAM) technology. In an embodiment of the disclosure, the processor 120 may identify the first location on the grid map by performing LiDAR SLAM for comparing the geometry information of the indoor space detected by using the LiDAR sensor 112 with pre-stored geometry information based on the LiDAR sensor 112.

The grid map may include a searched area, which has been searched by the sensor module 110 at the first location at which the cleaning robot 100 is located, and an unsearched area, which has not been searched by the sensor module 110. In an embodiment of the disclosure, the grid map may include one or more unsearched areas. The one or more unsearched areas may be distinguished from each other by their locations and shapes.

The processor 120 may determine, based on the distance from the first location, a first unsearched area among one or more unsearched areas, which have not been searched at the first location. In an embodiment of the disclosure, the processor 120 may detect the first unsearched area among the one or more unsearched areas by searching the surrounding area by using a BFS scheme in four directions or eight directions based on the first location on the grid map. For example, the processor 120 may detect the first unsearched area by using an A-star (A*) algorithm that searches for the shortest path to move from a starting node to a target node. However, the disclosure is not limited thereto, and the processor 120 may detect the first unsearched area at the shortest distance from the first location on the grid map by using any known BFS scheme. Alternatively, when one or more unsearched areas are detected, the processor 120 may select a location that does not represent the shortest distance from the first location. For example, the processor 120 may select a moving path that proceeds in a sequence having a shortest total distance to reach all of the one or more unsearched areas, where the sequence need not start with the closest unsearched area relative to the first location of the cleaning robot 100. Further, a line of sight of the LiDAR sensor 112 may be obstructed or partially obstructed by one or more obstacles, and the processor 120 may be unable to initially determine a distance to all of the one or more unsearched areas from the first location of the cleaning robot 100. As such, the selection of the moving path may change as the cleaning robot 100 navigates around obstacles.

The processor 120 may perform path-planning of a moving path from the first location, which is the current location of the cleaning robot 100, to the first unsearched area, and control the moving assembly 140 such that the cleaning robot 100 moves from the first location toward a location of the first unsearched area. The moving assembly 140 is a device configured to move the cleaning robot 100 to the location of a travel destination (e.g., the first unsearched area) under the control of the processor 120. The moving assembly 140 may include a pair of wheels (e.g., two or more wheels) that allow the cleaning robot 100 to move forward and backward, and rotate, a wheel motor that applies a moving force to one or more of the wheels, a caster wheel that is installed in front of the cleaning robot 100 to rotate according to the state of a floor surface on which the cleaning robot 100 moves, and thus change the angle of the cleaning robot 100, and the like. The wheel motor may rotate each wheel independently forward or backward and may also rotate each wheel such that the number of rotations of the wheels is different from each other.

The processor 120 may detect at least one obstacle around the location of the first unsearched area by using the sensor module 110. In an embodiment of the disclosure, the processor 120 may detect obstacles around the location of the first unsearched area by using the obstacle detection sensor 114. The obstacles may be, for example, a wall surface, a wall edge, a protrusion, furniture, a home appliance, or a pet in the indoor space, but are not limited thereto. Some of the obstacles may be fixed, such as a support column, while other obstacles may be temporary, such as shoes, clothing, toys, books, and other such items. The processor 120 may compare the distance between the detected obstacles with the width of the cleaning robot 100. When the distance between the obstacles exceeds the width of the cleaning robot 100 based on the result of the comparing, the processor 120 may determine the first unsearched area as the travel destination. The processor 120 may control the moving assembly 140 to move the cleaning robot 100 toward the first unsearched area determined as the travel destination. An example of an embodiment in which the processor 120 compares the distance between obstacles around the location of an unsearched area with the width of the cleaning robot 100 and determines the travel destination based on the result of the comparing will be described in detail with reference to FIGS. 6 and 7.

The processor 120 may determine a moving path for moving from the first location, which is the current location of the cleaning robot 100, to the first unsearched area. In an embodiment of the disclosure, the processor 120 may obtain information about at least one via point, which is passed through in moving from the first location to the location of the first unsearched area, and perform path-planning by using the obtained information about the at least one via point, so as to optimize the moving path. In an embodiment of the disclosure, the processor 120 may optimize the moving path by merging or deleting at least one via point based on the shortest distance between the first location and the location of the first unsearched area and location information of an obstacle adjacent to the line indicating the shortest distance. An example of an embodiment in which the processor 120 establishes a path plan for optimizing a moving path will be described in detail with reference to FIGS. 8 and 9.

The processor 120 may obtain area information about the first unsearched area after or while the cleaning robot 100 moves from the first location to the first unsearched area. In an embodiment of the disclosure, the processor 120 may obtain the area information including at least one of geometry information, structure information, or obstacle information of the first unsearched area by using the sensor module 110. For example, the processor 120 may obtain the geometry information and the structure information of the first unsearched area by using the LiDAR sensor 112, and obtain the obstacle information by detecting an obstacle in the first unsearched area by using the obstacle detection sensor 114.

The processor 120 may update the grid map by using the obtained area information of the first unsearched area. After the cleaning robot 100 moves to the location of the first unsearched area, the processor 120 may detect a second unsearched area by searching the surrounding area based on the location of the first unsearched area on the updated grid map. Here, the first unsearched area may be indicated as a searched area (i.e., by a lattice pattern) on the updated grid map. According to an embodiment of the disclosure, the processor 120 may detect the second unsearched area among one or more unsearched areas by searching the surrounding area in the four directions or eight directions by using the BFS scheme based on the location that was the first unsearched area (i.e., transitioned to a searched area) on the updated grid map. Here, the 'one or more unsearched areas' may refer to newly defined unsearched areas on the updated grid map. The processor 120 may obtain area information about the second unsearched area. An example of an embodiment in which the processor 120 detects the second unsearched area after moving to the first unsearched area will be described in detail with reference to FIG. 10A.

In another embodiment of the disclosure, the processor 120 may detect the second unsearched area on the grid map updated while the cleaning robot 100 moves to the location of the first unsearched area. The processor 120 may detect the second unsearched area on the updated grid map by searching the surrounding area based on the location of any one intermediate via point among a plurality of via points included in the moving path while moving to the location of the first unsearched area along the moving path. In an embodiment of the disclosure, the processor 120 may detect the second unsearched area by searching the surrounding area based on the location of a preset via point among the plurality of via points in the four directions or eight directions by using the BFS scheme. The preset via point may be a via point corresponding to an order preset by a user, among the plurality of via points in order from the first location, which is the starting point, to the location of the first unsearched area, which is the destination, along the moving path. In an embodiment of the disclosure, the preset via point may be, among the plurality of via points arranged in order along the moving path, a via point corresponding to the ordinal number that precedes, by a preset value, the ordinal number corresponding to the first unsearched area, which is the destination. An example of an embodiment in which the processor 120 detects the second unsearched area while the cleaning robot 100 moves to the location of the first unsearched area will be described in detail with reference to FIG. 10B.

The processor 120 may obtain area information about one or more unsearched areas to update the grid map and store the updated grid map. The processor 120 may store the updated grid map in the memory 130.

However, the disclosure is not limited thereto, and the processor 120 may store the updated grid map in a separate storage unit (not shown) included in the cleaning robot 100 or a web-based database (not shown), for example. The storage unit may include a non-volatile memory. The non-volatile memory refers to a recording medium that may store and retain information even when power is not supplied, and may use the stored information when power is supplied. The non-volatile memory may include at least one of a flash memory, a hard disk, a solid-state drive (SSD), a multimedia card micro-type memory, a card-type memory (e.g., an SD or XD memory), ROM, a magnetic disk, or an optical disk. In the case where the processor 120 stores the updated grid map in the web-based database, the cleaning robot 100 may further include a communication interface capable of performing wired/wireless data communication with the web-based database.

The processor 120 may identify, for instance, by using SLAM technology, the current location of the cleaning robot 100 moving on the grid map. When the identified location of the cleaning robot 100 is within a preset threshold distance from a charging station, the processor 120 may store the updated grid map.

Figure 3:
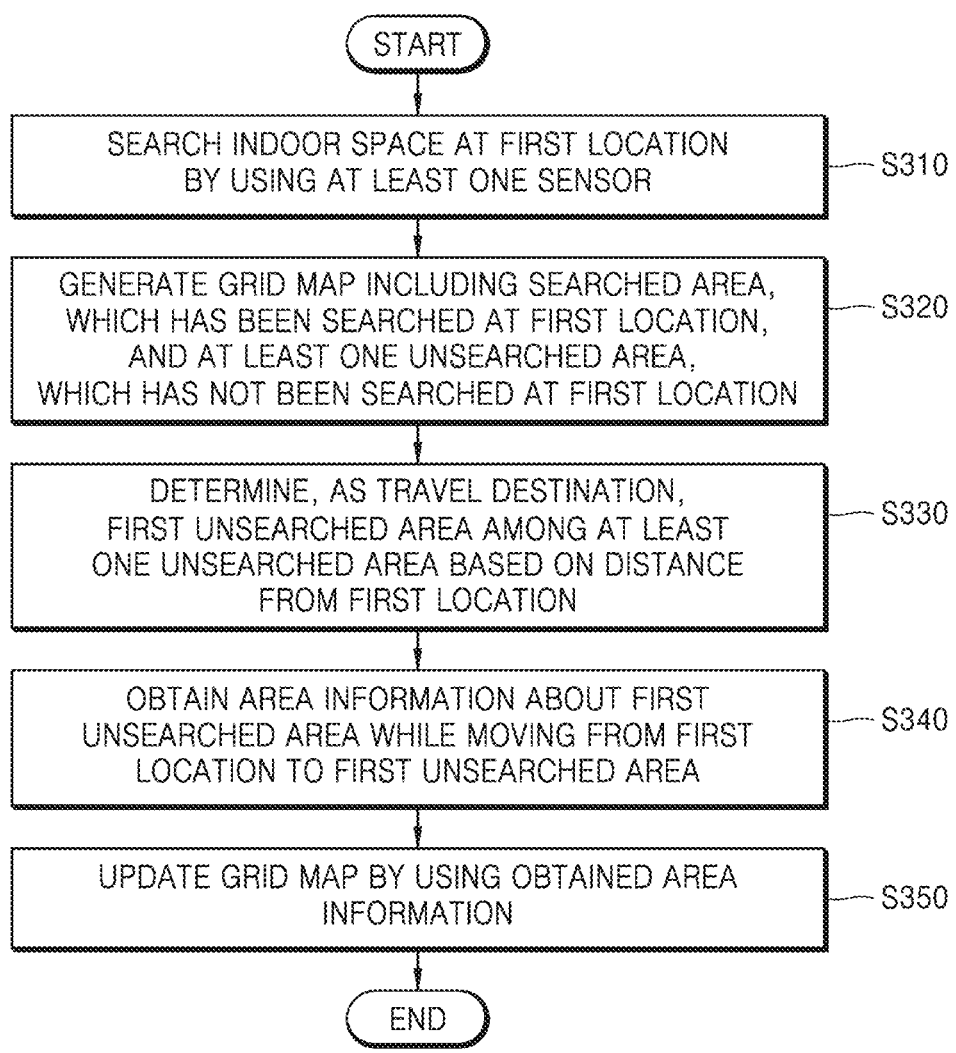
FIG. 3 is a flowchart illustrating an operating method of a cleaning robot, according to an embodiment of the disclosure.

FIG. 3 is a flowchart illustrating an operating method of the cleaning robot 100, according to an embodiment of the disclosure.

In operation S310, the cleaning robot 100 searches an indoor space at a first location by using at least one sensor, such as a sensor of the sensor module 110 of FIGS. 1 and 2. In an embodiment of the disclosure, the cleaning robot 100 may obtain geometry information of the indoor space by searching the indoor space within a preset range based on the first location by using the LiDAR sensor 112 (see FIG. 2). For example, the cleaning robot 100 may obtain the geometry information about the distance, location, and direction of a free space, a wall, an object, or an obstacle detected in the indoor space by using the LiDAR sensor 112.

In an embodiment of the disclosure, the cleaning robot 100 may obtain information about an obstacle in the indoor space by using the obstacle detection sensor 114 (see FIG. 2). The cleaning robot 100 may obtain the information about the obstacle in the indoor space, for example, a protrusion, furniture, a home appliance, or a pet in the indoor space.

In operation S320, the cleaning robot 100 generates a grid map including a searched area, which has been searched at the first location, and one or more unsearched areas, which have not been searched at the first location. In an embodiment of the disclosure, the cleaning robot 100 may generate the grid map by using the geometry information obtained by using the LiDAR sensor 112. The 'grid map' is a map in which the indoor space is represented by a plurality of grids or cells (hereinafter, referred to as 'cells') each having a preset size, and the presence or absence of an obstacle is indicated in each of the plurality of cells, based on information about obstacles detected by the LiDAR sensor 112. The size of each of the plurality of cells may be, for example, 40 mm×40 mm, i.e., a length of 40 mm and a width of 40 mm, but is not limited thereto.

Generally, an area of a radius of about 6 m from the LiDAR sensor 112 may be detected. The grid map may include a searched area, which has been searched within a detectable radius from the first location, and an unsearched area, which has not been searched by the LiDAR sensor 112. The searched area may include a first area, which is a free space in which no object or obstacle has been detected, and a second area in which an obstacle has been detected. The unsearched area is an area that has not been searched by the LiDAR sensor 112 and the obstacle detection sensor 114, and one or more unsearched areas may be included in the grid map. The one or more unsearched areas may be distinguished from each other by their locations and shapes. According to an embodiment of the disclosure, on the grid map, an unsearched area may be indicated without a pattern, and a searched area may be indicated by a lattice pattern.

In operation S330, the cleaning robot 100 determines, as a travel destination, a first unsearched area among the one or more unsearched areas based at least in part on the distance from the first location. In an embodiment of the disclosure, the cleaning robot 100 may search the surrounding area in the indoor space by using a BFS scheme in four directions or eight directions based on the first location. For example, the cleaning robot 100 may analyze areas on the grid map while expanding the analysis area in the four directions or eight directions based on the first location on the grid map. In this case, the cleaning robot 100 may detect the unsearched area (e.g., the first unsearched area) closest to the first location. For example, the first unsearched area closest to the first location on the grid map may be indicated with no pattern. For example, the cleaning robot 100 may detect the first unsearched area by using an A* algorithm that searches for the shortest path to move from a starting node to a target node. However, the disclosure is not limited thereto, and the cleaning robot 100 may detect the first unsearched area, which is at the shortest distance from the first location, by using any known BFS scheme.

In operation S340, the cleaning robot 100 obtains area information about the first unsearched area while moving from the first location to the first unsearched area. The cleaning robot 100 may use at least one sensor of the sensor module 110 to obtain the area information about the first unsearched area after or while moving to the first unsearched area. The area information may include at least one of geometry information, structure information, or obstacle information of the first unsearched area. In an embodiment of the disclosure, the cleaning robot 100 may obtain geometry information about at least one of the structure of the first unsearched area, the distance, location, direction, or material of an object or an obstacle in the first unsearched area by using the LiDAR sensor 112. In an embodiment of the disclosure, the cleaning robot 100 may obtain the obstacle information by detecting an obstacle in the first unsearched area by using the obstacle detection sensor 114. The cleaning robot 100 may use at least one sensor of the sensor module 110 to obtain area information about an unsearched area other than the first unsearched area while moving from the first location to the first unsearched area.

In operation S350, the cleaning robot 100 updates the grid map by using the obtained area information.

In an embodiment of the disclosure, after moving to the location of the first unsearched area, the cleaning robot 100 may detect a second unsearched area by searching the surrounding area based on the location of the first unsearched area on the updated grid map.

In another embodiment of the disclosure, the cleaning robot 100 may detect the second unsearched area on the updated grid map while moving to the location of the first unsearched area. The cleaning robot 100 may also detect the second unsearched area by searching the surrounding area based on the location of a certain via point among a plurality of via points included in a moving path, while moving to the location of the first unsearched area along the moving path.

After obtaining area information about all unsearched areas included in the grid map, the cleaning robot 100 may store the finally updated grid map. When the cleaning robot 100 moves toward the charging station, the cleaning robot 100 may store the grid map again to reflect update details after storing the grid map. For example, the cleaning robot 100 may store the updated grid map when the distance between the cleaning robot 100 and the charging station is within a preset threshold distance.

Figure 4:
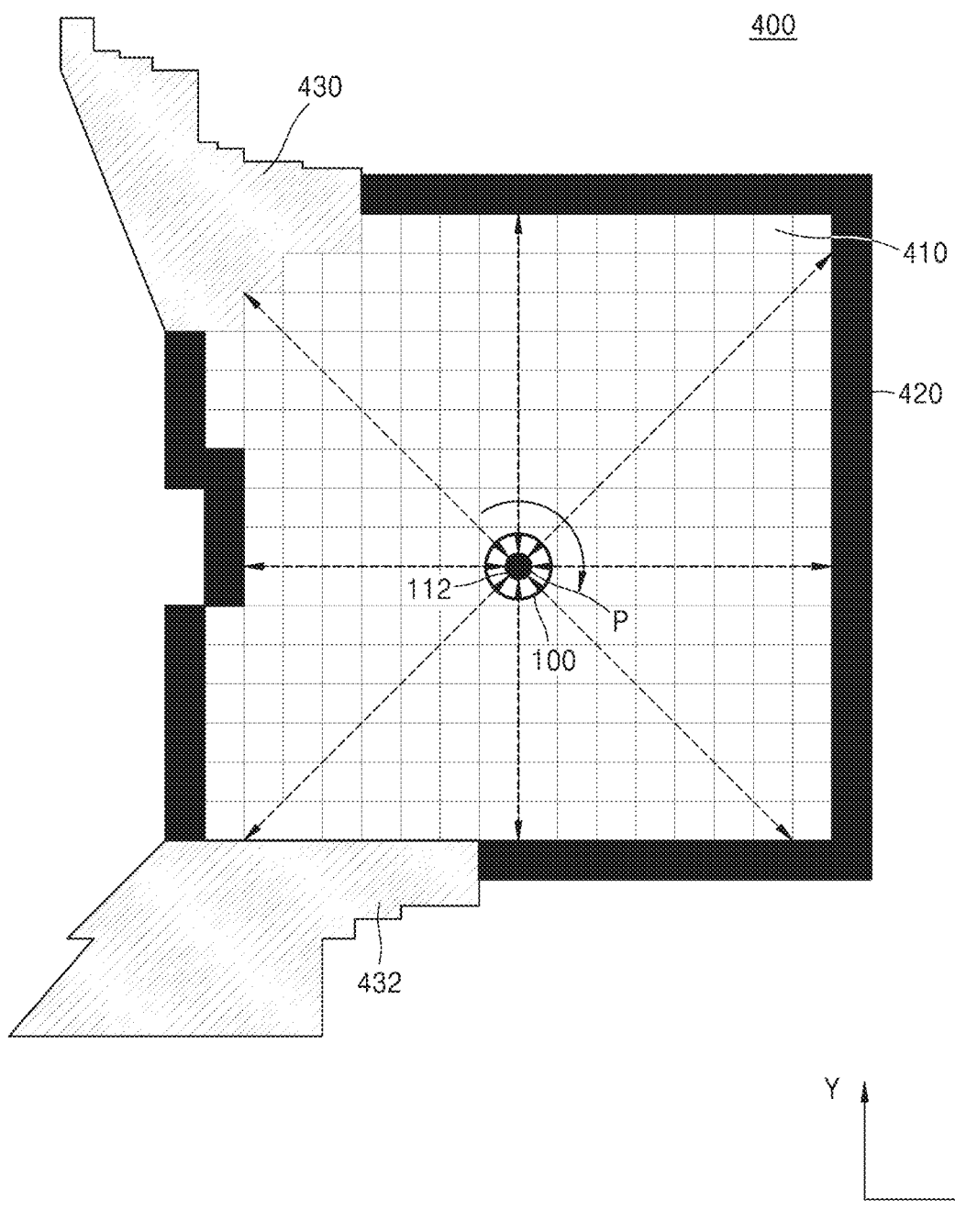
FIG. 4 is a diagram illustrating an example of a grid map obtained by a cleaning robot by searching an indoor space by using a sensor, according to an embodiment of the disclosure.

FIG. 4 is a diagram illustrating an example of a grid map 400 obtained by the cleaning robot 100 by searching an indoor space by using a sensor, according to an embodiment of the disclosure.

Referring to FIG. 4, the cleaning robot 100 may generate the grid map 400 by searching the indoor space at a first location P by using the LiDAR sensor 112. In an embodiment of the disclosure, the cleaning robot 100 may obtain geometry information about the indoor space while rotating the LiDAR sensor 112 by 360° at the first location P. The LiDAR sensor 112 may obtain geometry information about an area within a preset range. For example, the LiDAR sensor 112 may obtain geometry information about an area within a radius of 6 m from the first location P, which is the current location of the cleaning robot 100.

The grid map 400 is a map in which the indoor space is represented by a plurality of grids or cells (hereinafter, referred to as 'cells') each having a preset size, and the presence or absence of an obstacle is indicated in each of the plurality of cells. The size of each of the plurality of cells may be, for example, 40 mm×40 mm, i.e., a length of 40 mm and a width of 40 mm, but is not limited thereto.

The grid map 400 may include searched areas 410 and 420 (hereinafter, also referred to as the first and second areas 410 and 420), which have been searched by the LiDAR sensor 112 at the first location P at which the cleaning robot 100 is located, and unsearched areas 430 and 432, which have not been searched by the LiDAR sensor 112. As a result of the search using the LiDAR sensor 112, the searched areas 410 and 420 may include the first area 410, which is a free space in which no object or obstacle has been detected, and the second area 420 in which an obstacle has been detected. In the embodiment illustrated in FIG. 4, the second area 420 may be an area in which a wall or obstacle in the indoor space exists.

The unsearched areas 430 and 432 indicate areas which have not been searched by the LiDAR sensor 112. In an embodiment of the disclosure, the grid map 400 may include one or more unsearched areas 430 and 432. The one or more unsearched areas 430 and 432 may be distinguished from each other by their locations and shapes.

In an embodiment of the disclosure, the cleaning robot 100 may identify the searched areas 410 and 420 and the unsearched areas 430 and 432 by allocating a bit to each of the plurality of cells included in the grid map 400. The cleaning robot 100 may allocate different bits to the first area 410 and the second area 420 of the searched areas 410 and 420, to distinguish the first area 410 and the second area 420 from each other.

Figure 5:
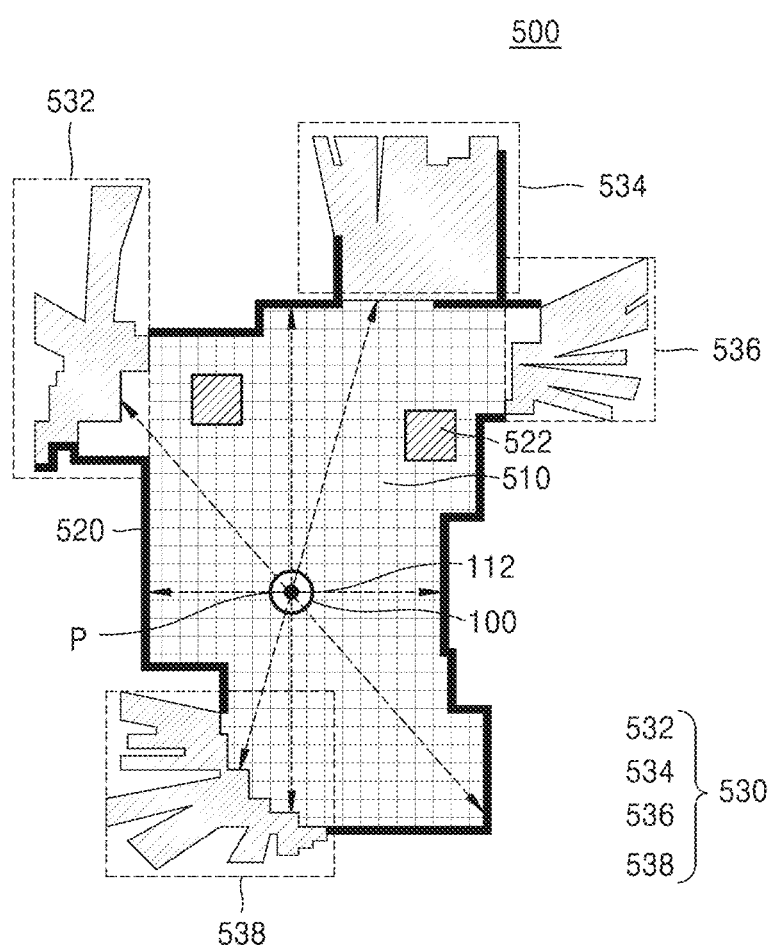
FIG. 5 is a diagram illustrating a grid map obtained by a cleaning robot by searching an indoor space by using a sensor, according to an embodiment of the disclosure.

FIG. 5 is a diagram illustrating a grid map 500 obtained by the cleaning robot 100 by searching an indoor space by using a sensor, according to an embodiment of the disclosure.

Referring to FIG. 5, the cleaning robot 100 may generate a grid map 500 by searching an indoor space by using the sensor module 110 (see FIG. 2) at the first location P. The grid map 500 may include searched areas 510, 520, and 522 (hereinafter, also referred to as the first area 510 and the second areas 520 and 522), which have been searched by the LiDAR sensor 112 at the first location P at which the cleaning robot 100 is located, and an unsearched area 530, which has not been searched by the LiDAR sensor 112. In an embodiment of the disclosure, the cleaning robot 100 may detect an obstacle at searched area 522 in the indoor space by using the obstacle detection sensor 114 (see FIG. 2).

According to a result of the search using the LiDAR sensor 112, the first area 510 of the searched areas 510 and 520 in the grid map 500 may be an area which is a free space in which no object or obstacle has been detected, and the second areas 520 and 522 may be an area in which an obstacle has been detected. In the embodiment shown in FIG. 5, the second areas 520 and 522 may be areas in which a wall or an obstacle in the indoor space exists. On the grid map 500, the first area 510 may be indicated by a lattice pattern, and the second areas 520 and 522 may be indicated in black (without a pattern) or otherwise shaded.

In the embodiment illustrated in FIG. 5, the grid map 500 may include a plurality of unsearched areas 532 (hereinafter, also referred to as the first unsearched area 532), 534, 536, and 538. The processor 120 (see FIG. 2) of the cleaning robot 100 may determine the first unsearched area 532 among the plurality of unsearched areas 532, 534, 536, and 538, which have not been searched at the first location P, based on the distance from the first location P. In an embodiment of the disclosure, the processor 120 may search the surrounding area on the grid map 500 in four directions or eight directions based on the first location P by using a BFS scheme. The processor 120 may detect the first unsearched area 532 by using, for example, an A* algorithm that searches for the shortest path to move from a starting node to a target node.

However, the disclosure is not limited thereto, and the processor 120 may detect the first unsearched area 532, which is at the shortest distance from the first location P, by using any known BFS scheme.

The processor 120 may determine the detected first unsearched area 532 as a travel destination to which the cleaning robot 100 is to move. The processor 120 may control the moving assembly 140 (see FIG. 2) to move the cleaning robot 100 to the first unsearched area 532.

In the embodiment illustrated in FIG. 5, the cleaning robot 100 may search the indoor space within a preset radius (e.g., 6 m) from the first location P, which is the current location, by using the LiDAR sensor 112 so as to generate the grid map 500 including the searched areas 510 and 520 and the unsearched area 530, and then move to the first unsearched area 532, which may be at the shortest distance from the first location P in the unsearched area 530, to obtain area information about the first unsearched area 532. The cleaning robot 100, according to an embodiment of the disclosure, may move only to the unsearched area 530, without traveling through the entire indoor space in a zigzag pattern or traveling through an arbitrary area of the entire indoor space, and then obtain information about the structure and geometry information of the unsearched area 530, the presence or absence of an obstacle in the unsearched area 530, and the like, thereby reducing the time taken for obtaining a map compared to existing methods.

Figure 6:
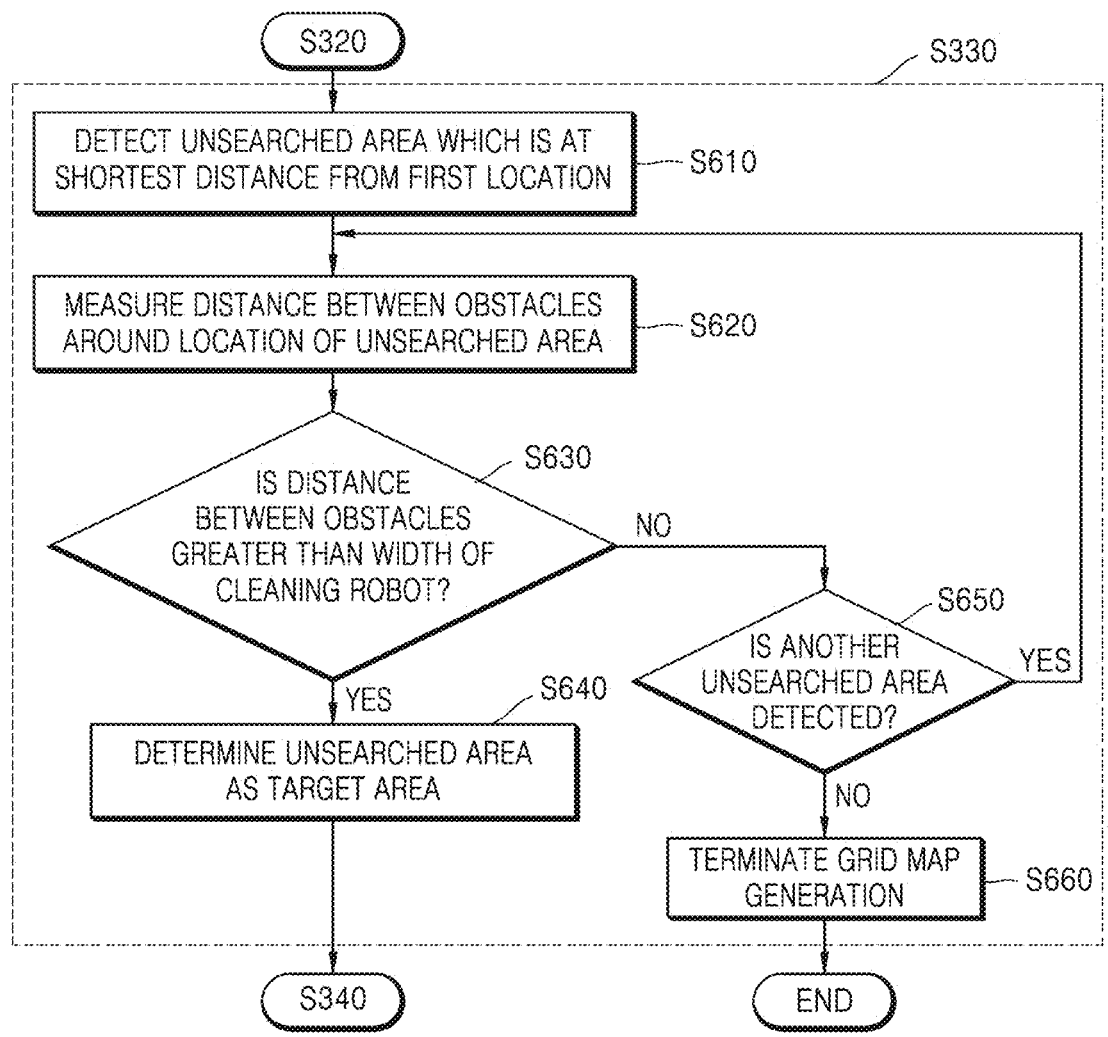
FIG. 6 is a flowchart illustrating a method, performed by a cleaning robot, of determining an unsearched area as a travel destination and moving to the travel destination to obtain information about the unsearched area, according to an embodiment of the disclosure.

FIG. 6 is a flowchart illustrating a method, performed by the cleaning robot 100, of determining an unsearched area as a travel destination and moving to the travel destination to obtain information about the unsearched area, according to an embodiment of the disclosure.

Operations S610 to S660 shown in FIG. 6 are subdivided operations of operation S330 shown in FIG. 3, according to an embodiment. Operation S610 of FIG. 6 may be performed after operation S320 of FIG. 3 is performed. After operation S640 of FIG. 6 is performed, operation S340 of FIG. 3 may be performed.

In operation S610, the cleaning robot 100 detects an unsearched area which is at the shortest distance from the first location. In an embodiment of the disclosure, the cleaning robot 100 may detect the unsearched area by searching the surrounding area by using a BFS scheme in four directions or eight directions based on the first location, which is the current location of the cleaning robot 100, on the grid map. For example, the cleaning robot 100 may detect the unsearched area, which is at the shortest distance from the first location, by searching the surrounding area by using an A* algorithm.

In operation S620, the cleaning robot 100 measures the distance between obstacles around a location of the unsearched area which is at the shortest distance from the first location. The cleaning robot 100 may detect obstacles, for example, a wall, a protrusion, furniture, a home appliance, a pet, or the like in the indoor space, which are around the unsearched area, by using at least one of the LiDAR sensor 112 (see FIG. 2) or the obstacle detection sensor 114 (see FIG. 2). In an embodiment of the disclosure, the cleaning robot 100 may measure the distance between the obstacles around a location of the unsearched area, on a moving path for moving to the unsearched area, by using at least one of the LiDAR sensor 112 or the obstacle detection sensor 114.

In operation S630, the cleaning robot 100 compares the measured distance between the obstacles with the width of the cleaning robot 100.

When the distance between the obstacles is greater than the width of the cleaning robot 100, the cleaning robot 100 determines the unsearched area, which is at the shortest distance from the first location, as the travel destination (operation S640).

When the distance between the obstacles is less than or equal to the width of the cleaning robot 100, the cleaning robot 100 does not determine the unsearched area, which is at the shortest distance from the first location, as the travel destination, and detects another unsearched area in the grid map (operation S650).

When the other unsearched area is detected, the cleaning robot 100 repeatedly performs operations S620 to S650 on the detected other unsearched area. For example, in the case where a plurality of unsearched areas are included in the grid map, and the distance between obstacles around a first unsearched area, which is at the shortest distance from the first location, is less than the width of the cleaning robot 100, the cleaning robot 100 may detect a second unsearched area from among the plurality of unsearched areas. The cleaning robot 100 may measure the distance between obstacles around a location of the second unsearched area, compare the measured distance between the obstacles with the width of the cleaning robot 100, and determine the second unsearched area as the travel destination based on a result of the comparing.

When any other unsearched area is not detected, the cleaning robot 100 terminates grid map generation (S660).

Figure 7:
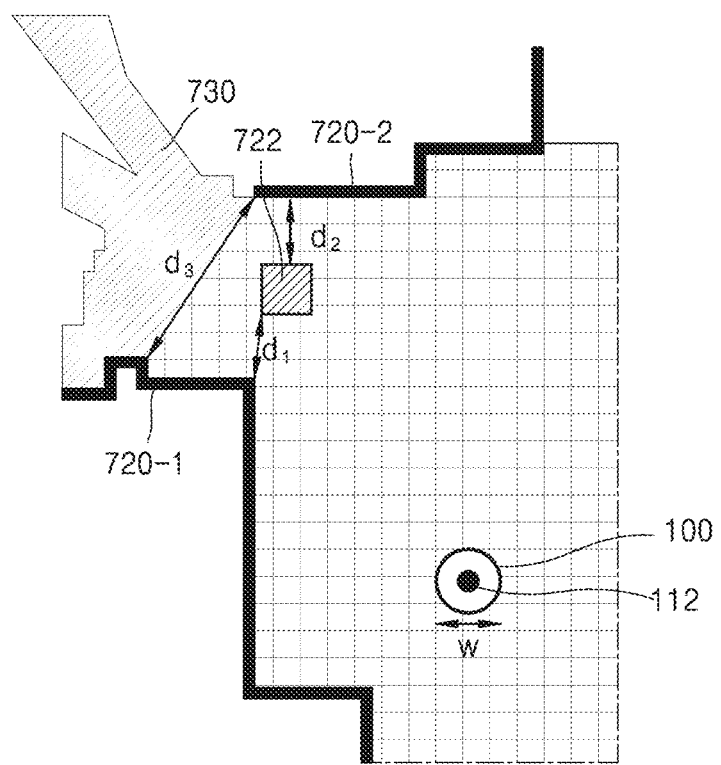
FIG. 7 is a diagram illustrating an operation, performed by a cleaning robot, of determining an unsearched area as a travel destination and moving to the travel destination, according to an embodiment of the disclosure.

FIG. 7 is a diagram illustrating an operation, performed by the cleaning robot 100, of determining an unsearched area 730 as a travel destination and moving to the travel destination, according to an embodiment of the disclosure.

Referring to FIG. 7, the cleaning robot 100 may detect obstacles 720-1, 720-2, and 722 (hereinafter, also referred to as the first wall surface 720-1, the second wall surface 720-2, and the object 722) around the unsearched area 730 by using the LiDAR sensor 112. In the embodiment shown in FIG. 7, the obstacles 720-1, 720-2, and 722 may include the first wall surface 720-1, the second wall surface 720-2, and the object 722 in an indoor space. The object 722 may be, for example, a protrusion, furniture, a home appliance, or a pet, but is not limited thereto. In an embodiment of the disclosure, the cleaning robot 100 may also detect the location and size of the object 722 by using the obstacle detection sensor 114 (see FIG. 2).

The processor 120 (see FIG. 2) of the cleaning robot 100 may measure the distances between the obstacles 720-1, 720-2, and 722 by using the LiDAR sensor 112. In the embodiment illustrated in FIG. 7, the processor 120 may measure a first distance $d_1$ between the first wall surface 720-1 and the object 722, a second distance $d_2$ between the second wall surface 720-2 and the object 722, and a third distance $d_3$ between the first wall surface 720-1 and the second wall surface 720-2, by using the LiDAR sensor 112.

The processor 120 may compare at least one of the measured first distance $d_1$, second distance $d_2$, or third distance $d_3$ with the width of the cleaning robot 100. When the first distance $d_1$, the second distance $d_2$, and the third distance $d_3$ are each greater than the width of the cleaning robot 100 based on a result of the comparing, the cleaning robot 100 may determine the unsearched area 730 as the travel destination. When at least one of the first distance $d_1$, the second distance $d_2$, or the third distance $d_3$ is less than the width of the cleaning robot 100 based on the result of the comparing, the cleaning robot 100 may not determine the unsearched area 730 as the travel destination, and search for the travel destination among other unsearched areas in the indoor space. The determination may depend upon the arrangement of the obstacles 720-1, 720-2, and 722. For example, in reference to FIG. 7, if the first distance $d_1$ and the third distance $d_3$ are both greater than the width of the cleaning robot 100 but the second distance $d_2$ is less than the width of the cleaning robot 100, then a sufficiently wide travel path should exist for the cleaning robot 100 to determine the unsearched area 730 as the travel destination. Similarly, if the second distance $d_2$ and the third distance $d_3$ are both greater than the width of the cleaning robot 100 but the first distance $d_1$ is less than the width of the cleaning robot 100, then a sufficiently wide travel path should exist for the cleaning robot 100 to determine the unsearched area 730 as the travel destination. If both the first distance $d_1$ and the second distance $d_2$ are less than the width of the cleaning robot 100, then the third distance $d_3$ is immaterial, as the cleaning robot 100 may have no path around obstacle 722, resulting in the unsearched area 730 being unreachable.

Figure 8:
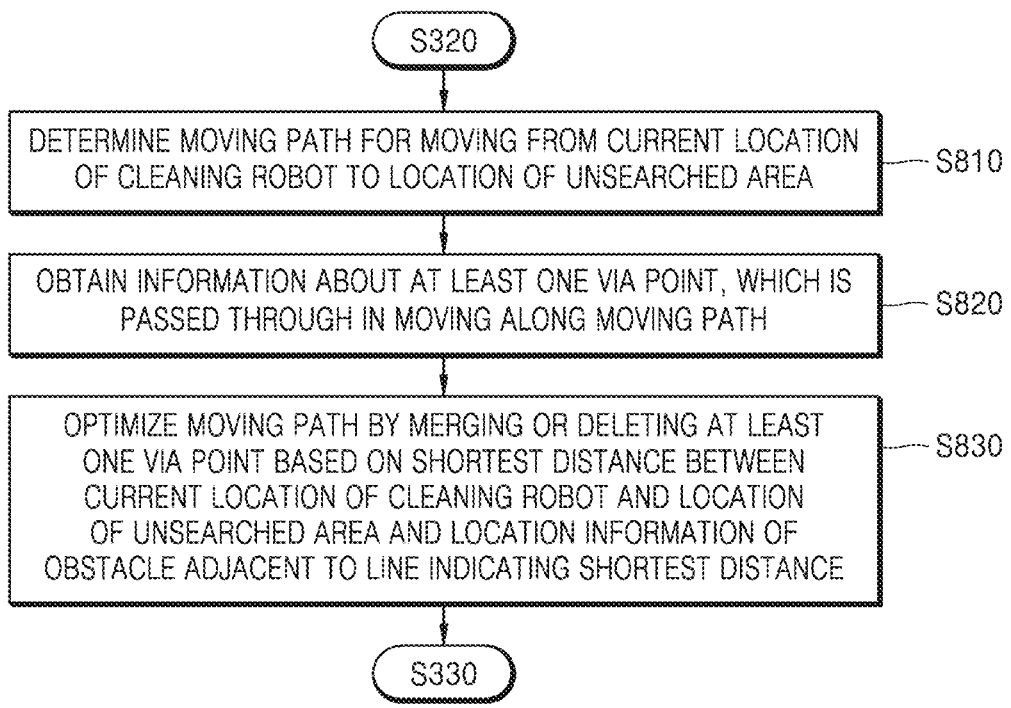
FIG. 8 is a flowchart illustrating a method, performed by a cleaning robot, of performing path-planning for moving to an unsearched area, according to an embodiment of the disclosure.

FIG. 8 is a flowchart illustrating a method, performed by the cleaning robot 100, of performing path-planning for moving to an unsearched area, according to an embodiment of the disclosure.

Operation S810 of FIG. 8 may be performed after operation S320 of FIG. 3 is performed. After operation S830 of FIG. 8 is performed, operation S330 of FIG. 3 may be performed.

Figure 9:
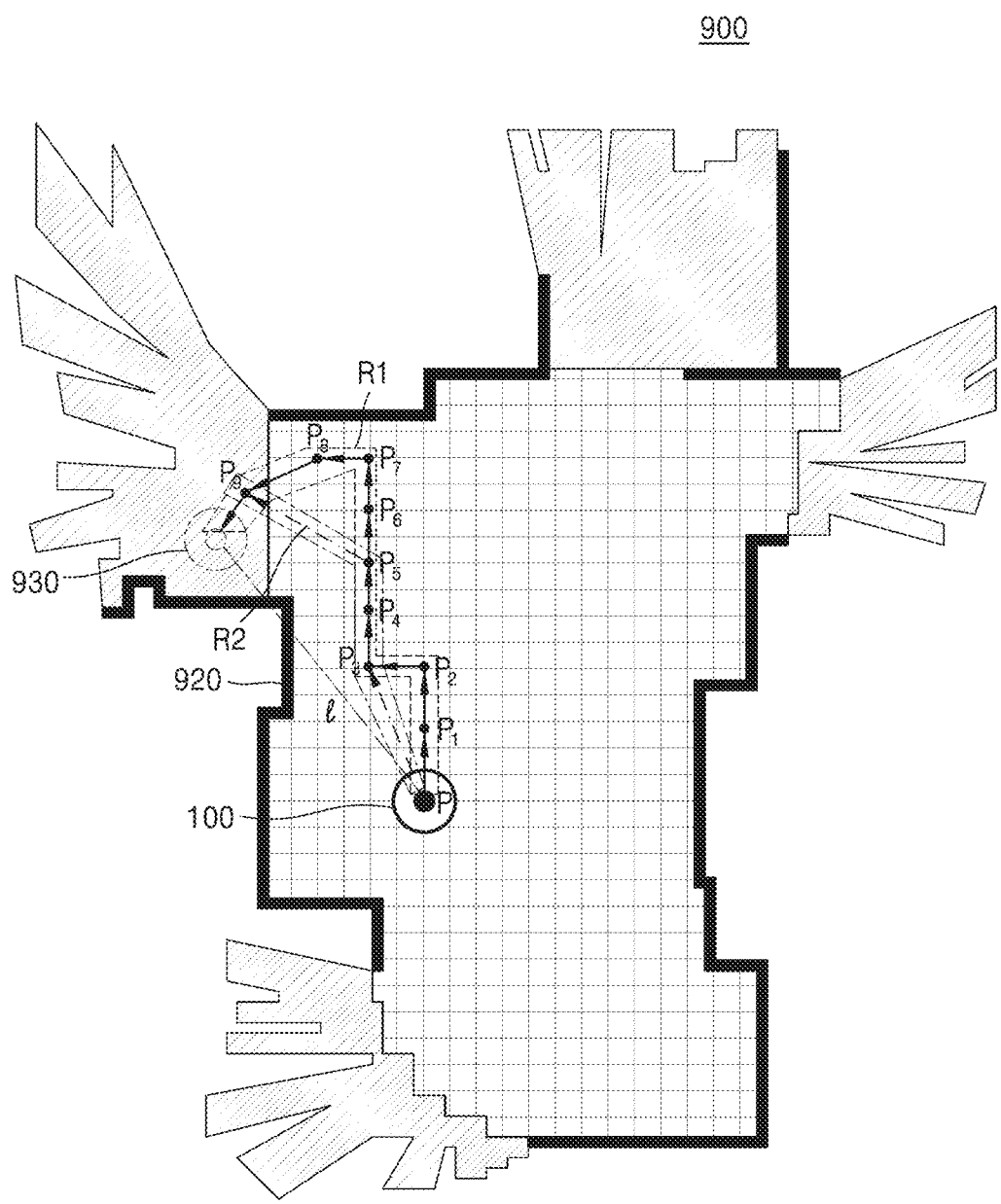
FIG. 9 is a diagram illustrating an operation, performed by a cleaning robot, of performing path-planning for moving to an unsearched area, according to an embodiment of the disclosure.

FIG. 9 is a diagram illustrating an operation, performed by the cleaning robot 100, of performing path-planning for moving to an unsearched area 930, according to an embodiment of the disclosure.

Hereinafter, an embodiment in which the cleaning robot 100 performs path-planning will be described with reference to FIGS. 8 and 9.

In operation S810, the cleaning robot 100 determines a moving path for moving from the current location to a location of an unsearched area determined as a travel destination. In an embodiment of the disclosure, the cleaning robot 100 may identify the current location of the cleaning robot 100 on a grid map by using SLAM technology. Referring to FIG. 9, the processor 120 (see FIG. 2) of the cleaning robot 100 may generate a first moving path $R_1$ for moving from the first location P to a location of the unsearched area 930 determined as the travel destination, on the grid map 900.

In operation S820, the cleaning robot 100 obtains information about at least one via point, which is passed through in moving along the moving path. Referring to FIG. 9, the processor 120 may generate the first moving path $R_1$ including a plurality of via points $P_1$ to $P_9$ (hereinafter, also referred to as the first via point $P_1$ to the ninth via point $P_9$), which are passed through in moving from the first location P to the location of the unsearched area 930. Although FIG. 9 illustrates the plurality of via points $P_1$ to $P_9$ include a total of nine via points, this is merely an example, and the via points are not limited as illustrated in FIG. 9. In an embodiment of the disclosure, the number of via points may be one or plural.

The processor 120 may obtain location information of the first via point $P_1$ to the ninth via point $P_9$ and information about the order in which they are passed through. For example, the first moving path $R_1$ may be a path that sequentially passes through the first via point $P_1$, the second via point $P_2$, . . . and the ninth via point $P_9$ from the first location P.

In operation S830, the cleaning robot 100 may optimize the moving path by merging or deleting at least one via point based on the shortest distance between the current location and the location of the unsearched area and location information of an obstacle adjacent to the line indicating the shortest distance. Referring to FIG. 9, the processor 120 of the cleaning robot 100 may determine the shortest distance by connecting the first location P and the location of the unsearched area 930 in a straight line. The processor 120 may detect an obstacle on or adjacent to a straight line $\ell$ connecting the first location P and the unsearched area 930, by using at least one of the LiDAR sensor 112 (see FIG. 2) or the obstacle detection sensor 114 (see FIG. 2). In the embodiment illustrated in FIG. 9, a wall surface 920 may be on the straight line $\ell$ indicating the shortest distance between the first location P and the location of the unsearched area 930, and the processor 120 may detect the wall surface 920 by using at least one of the LiDAR sensor 112 or the obstacle detection sensor 114. The processor 120 may optimize the first moving path $R_1$ based on the shortest distance and obstacle information. The processor 120 may determine a second moving path $R_2$ by optimizing the first moving path $R_1$.

In the embodiment illustrated in FIG. 9, the processor 120 may determine a path to move from the first location P to the third via point $P_3$ by deleting the first via point $P_1$ and the second via point $P_2$, and determine a path to move from the fifth via point $P_5$ to the ninth via point $P_9$ by merging the fourth via point $P_4$ and the fifth via point $P_5$, and deleting the sixth via point $P_6$ to the eighth via point $P_8$, among the plurality of via points $P_1$ to $P_9$ included in the first moving path $R_1$. The processor 120 may determine the second moving path $R_2$ to move while sequentially passing through the first location P, the third via point $P_3$, the fifth via point $P_5$, and the ninth via point $P_9$.

In the embodiment illustrated in FIGS. 8 and 9, the cleaning robot 100 may optimize the moving path to move from the first location P, which is the current location, to the location of the unsearched area 930 with the shortest distance, thereby providing an effect of reducing the travel time to the unsearched area 930.

Figure 10A:
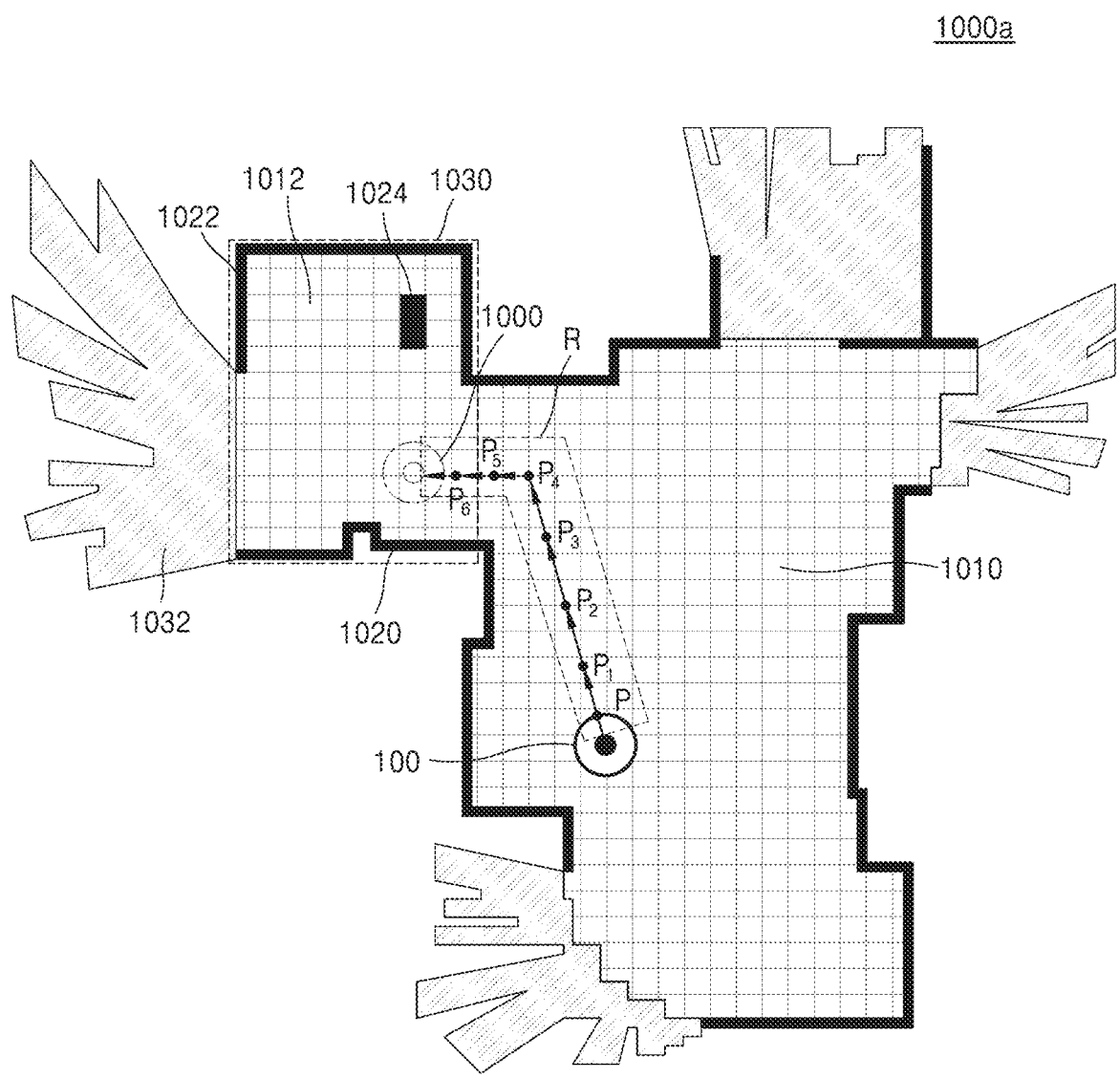
FIG. 10A is a diagram illustrating an operation, performed by a cleaning robot, of detecting a second unsearched area after moving to a first unsearched area, according to an embodiment of the disclosure.

FIG. 10A is a diagram illustrating an operation, performed by the cleaning robot 100, of detecting a second unsearched area 1032 after moving to a first unsearched area 1030, according to an embodiment of the disclosure.

Referring to FIG. 10A, the cleaning robot 100 may move to a location of the first unsearched area 1030, which is a travel destination, along a moving path R, and then obtain area information about the first unsearched area 1030. In an embodiment of the disclosure, the processor 120 (see FIG.

2) of the cleaning robot 100 may control the moving assembly 140 (see FIG. 2) to move the cleaning robot 100 from the first location P to the location of the first unsearched area 1030 along the moving path R. The moving path R may include a plurality of via points $P_1$ to $P_6$.

After the cleaning robot 100 moves to the first unsearched area 1030 via all of the plurality of via points $P_1$ to $P_6$ included in the moving path R, the processor 120 may obtain area information including at least one of geometry information, structure information, or obstacle information about the first unsearched area 1030 by using the sensor module 110 (see FIG. 2). In an embodiment of the disclosure, the processor 120 may obtain the structure information of the first unsearched area 1030 and the geometry information about at least one of the distance, location, direction, or material of an obstacle in the first unsearched area 1030 by using the LiDAR sensor 112 (see FIG. 2). In an embodiment of the disclosure, the processor 120 may obtain the obstacle information by detecting an obstacle in the first unsearched area 1030 by using the obstacle detection sensor 114 (see FIG. 2). In the embodiment illustrated in FIG. 10A, the processor 120 may detect, as obstacles, a wall 1020, a wall 1022, and an object 1024 (hereinafter, also referred to as the obstacle 1024) around the first unsearched area 1030 by using the LiDAR sensor 112. The object 1024 may be, for example, any one of a protrusion, furniture, a home appliance, or a pet, but is not limited thereto.

The processor 120 may update a grid map 1000a by using the area information obtained with respect to the first unsearched area 1030. After updating the grid map 1000a, the first unsearched area 1030 may be transitioned from the unsearched area to a searched area. The searched area may include a first area 1012, which is a free space in which no obstacle has not been detected, and a second area in which the wall 1020, the wall 1022, and/or the obstacle 1024 has been detected.

The processor 120 may determine a new travel destination among unsearched areas based on the current location (e.g., a location in the first area 1012) of the cleaning robot 100 on the updated grid map 1000a. For example, the cleaning robot 100 may detect the second unsearched area 1032 among the unsearched areas in the updated grid map 1000a. The processor 120 may determine, as the new travel destination, the detected second unsearched area 1032. In an embodiment of the disclosure, the processor 120 may detect the second unsearched area 1032 by analyzing the surrounding area by using a BFS scheme in four directions or eight directions based on a certain location in the first area 1012 on the updated grid map 1000a. The processor 120 may detect the second unsearched area 1032 by using, for example, an A* algorithm, and determine the detected second unsearched area 1032 as the new travel destination.

Figure 10B:
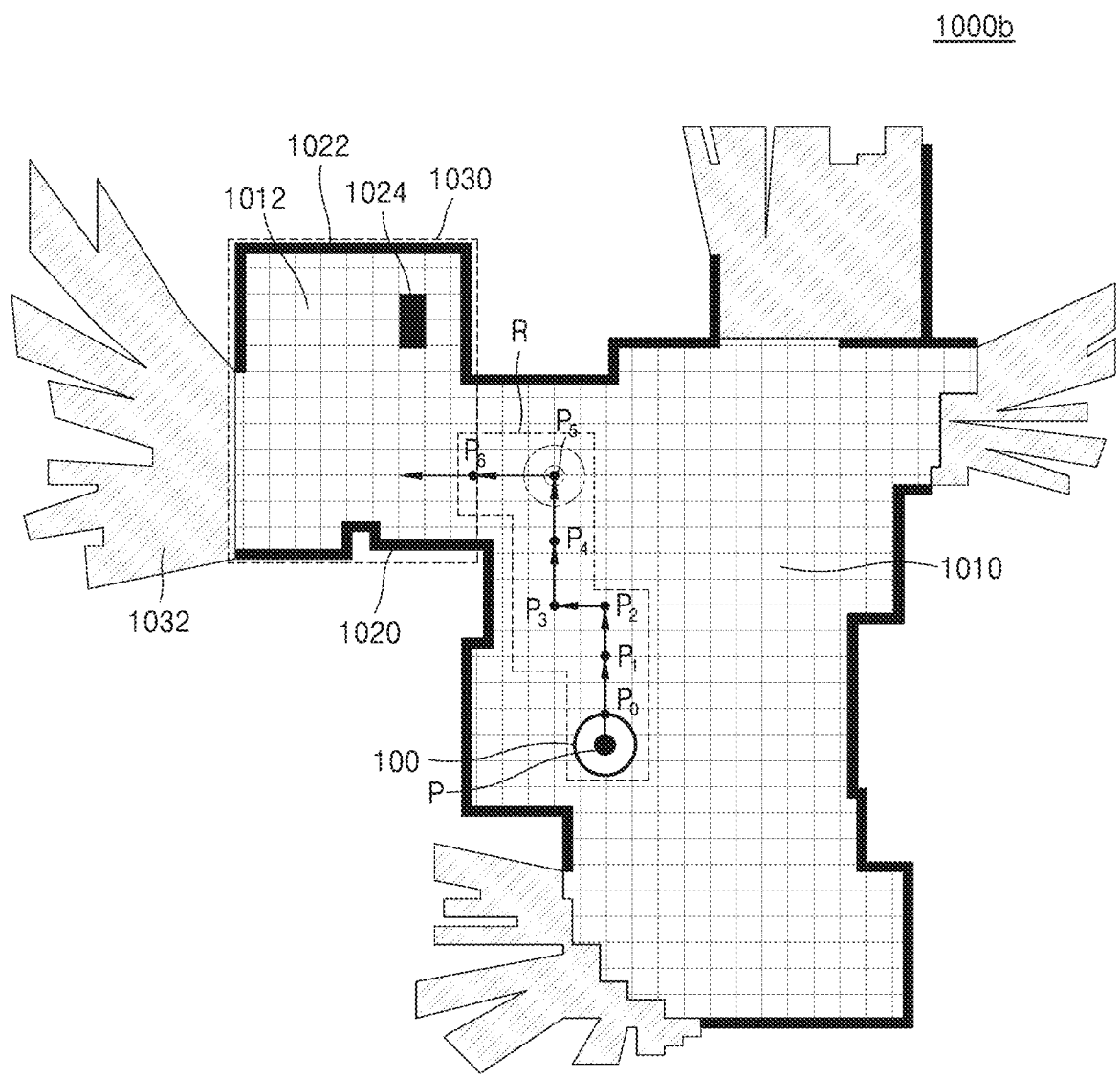
FIG. 10B is a diagram illustrating an operation, performed by a cleaning robot, of detecting a second unsearched area at a via point while moving to a first unsearched area, according to an embodiment of the disclosure.

FIG. 10B is a diagram illustrating an operation, performed by the cleaning robot 100, of detecting the second unsearched area 1032, which is a second travel destination, at a via point while moving to the first unsearched area 1030, which is a first travel destination, according to an embodiment of the disclosure.

Referring to FIG. 10B, the cleaning robot 100 may obtain area information about the first unsearched area 1030 at any one of the plurality of via points $P_1$ to $P_6$ (hereinafter, also referred to as the fifth via point $P_5$ and the sixth via point $P_6$) included in the moving path R. In an embodiment of the disclosure, the processor 120 (see FIG. 2) of the cleaning robot 100 may control the moving assembly 140 (see FIG. 2) to move the cleaning robot 100 from the first location P, which is a starting point, to the location of the first unsearched area 1030, which is the first travel destination, sequentially via the plurality of via points $P_1$ to $P_6$ included in the moving path R.

While the cleaning robot 100 moves sequentially via the plurality of via points $P_1$ to $P_6$ included in the moving path R, the processor 120 may obtain the area information including at least one of geometry information, structure information, or obstacle information about the first unsearched area 1030 by using the sensor module 110 (see FIG. 2). For example, the processor 120 may obtain all of the area information about the first unsearched area 1030 when arriving at a certain intermediate via point of the plurality of via points $P_1$ to $P_6$, and update a grid map 1000b. At this time, the first unsearched area 1030 may be transitioned from the unsearched area to a searched area on the updated grid map 1000b.

In an embodiment of the disclosure, the 'intermediate via point' refers to any via point prior to the last via point (e.g., the sixth via point $P_6$) among the plurality of via points $P_1$ to $P_6$ arranged from the first location P, which is the starting point, to the first unsearched area 1030, which is the destination. For example, in the case where the number of via points including $P_1$ to $P_n$ is n, the intermediate via point may be a via point corresponding to $P_{n-m}$, which precedes the n-th via point $P_n$ by m. Here, m may be an integer of any one of 0, 1, 2, . . . , n−1. In an embodiment of the disclosure, m may be a value preset by a user.

For example, in the case where there are a total of six via points from $P_1$ to $P_6$ (n=6), the search of the first unsearched area 1030 may be completed when the cleaning robot 100 arrives at $P_1$ ($P_{n-5}$), the search of the first unsearched area 1030 may be completed when the cleaning robot 100 arrives at $P_2$ ($P_{n-4}$), the search of the first unsearched area 1030 may be completed when the cleaning robot 100 arrives at $P_3$ ($P_{n-3}$), the search of the first unsearched area 1030 may be completed when the cleaning robot 100 arrives at $P_4$ ($P_{n-2}$), or the search of the first unsearched area 1030 may be completed when the cleaning robot 100 arrives at $P_5$ ($P_{n-1}$). In the embodiment illustrated in FIG. 10B, it is assumed that the search of the first unsearched area 1030 is completed when the cleaning robot 100 arrives at $P_5$ among the plurality of via points $P_1$ to $P_6$.

The processor 120 may update the grid map 1000b by using the area information obtained with respect to the first unsearched area 1030. After updating the grid map 1000b, the first unsearched area 1030 may be transitioned from the unsearched area to a first searched area 1012.

The processor 120 may detect the second unsearched area 1032 by analyzing the grid map 1000b based on the location of the fifth via point $P_5$, which is the location to which the cleaning robot 100 has moved, and determine the second unsearched area 1032 as the second travel destination. A method, performed by the processor 120, of determining the second unsearched area 1032 as the second travel destination is the same as the method described with reference to FIG. 10A except for the location of basis, and thus, a duplicate description will be omitted.

In the embodiments illustrated in FIGS. 10A and 10B, the cleaning robot 100 may search the first unsearched area 1030 to obtain the area information about the first unsearched area 1030, update the grid maps 1000a and 1000b, and determine, as the new travel destination, the second unsearched area 1032, which is a new unsearched area on the updated grid maps 1000a and 1000b.

In the embodiment of FIG. 10A, the cleaning robot 100 having moved to the first unsearched area 1030, which is the first travel destination, may determine, as the second travel destination, the second unsearched area 1032 by analyzing the surrounding area based on the current location of the cleaning robot 100 in the first unsearched area 1030 included in the updated grid map 1000*a*, whereas, in the embodiment of FIG. 10B, the cleaning robot 100, at the intermediate via point (the fifth via point P₅ in the embodiment of FIG. 10B) while moving along the moving path R, may determine the second unsearched area 1032 as the second travel destination. The area that is detectable by the LiDAR sensor 112 (see FIG. 2) is about 6 m in radius from the location of the cleaning robot 100, and thus the cleaning robot 100, according to the embodiment of FIG. 10B, may detect the second unsearched area 1032, which is the second travel destination, from the intermediate via point without having to move to the first unsearched area 1030, which is the first travel destination. Accordingly, the cleaning robot 100 according to the embodiment illustrated in FIG. 10B may reduce unnecessary movement and efficiently detect a travel destination. In addition, the cleaning robot 100, according to the embodiment illustrated in FIG. 10B, may provide a technical effect of reducing the time taken to generate the grid map 1000*b* compared to the embodiment illustrated in FIG. 10A.

Figure 11:
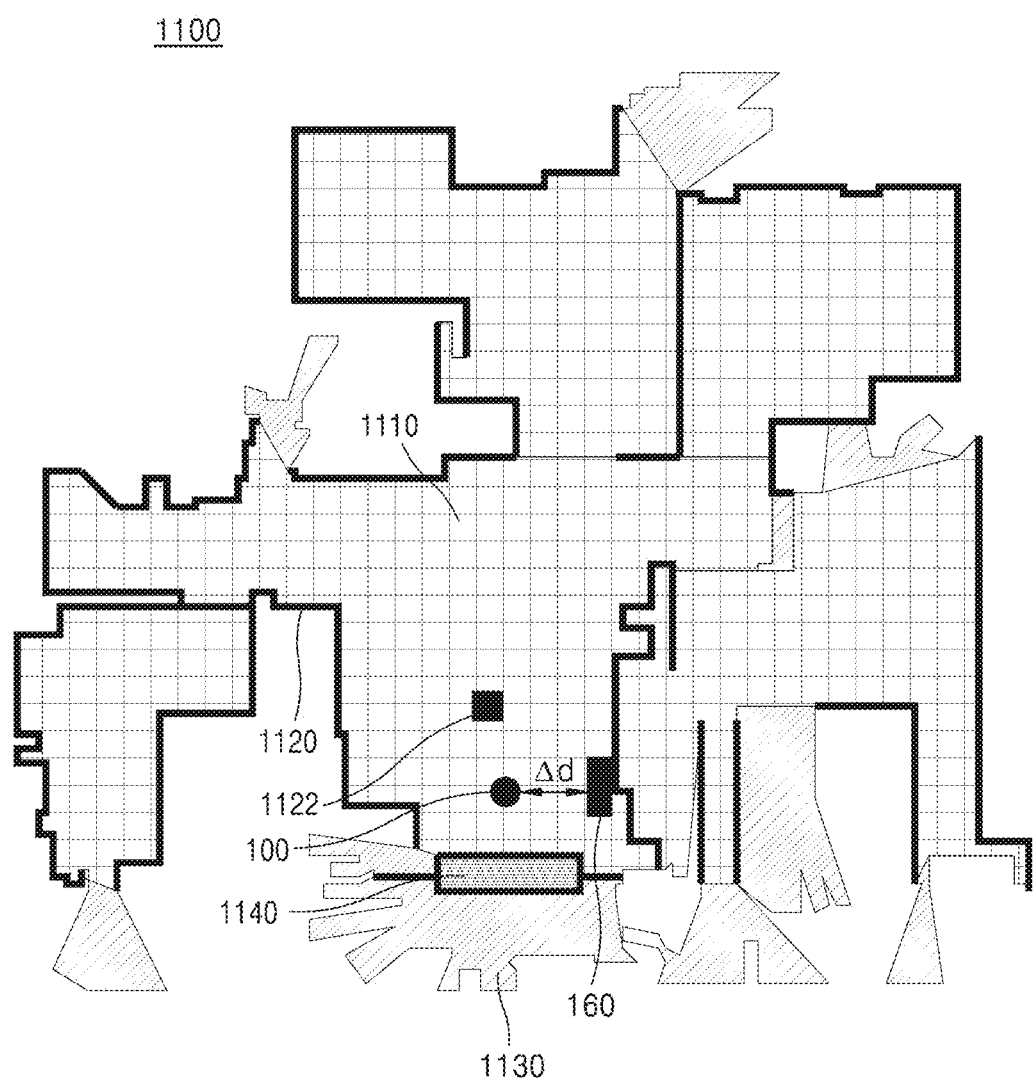
FIG. 11 is a diagram illustrating a grid map obtained by a cleaning robot, according to an embodiment of the disclosure.

FIG. 11 is a diagram illustrating a grid map 1100 obtained by the cleaning robot 100, according to an embodiment of the disclosure.

Referring to FIG. 11, the cleaning robot 100 may search an indoor space to obtain area information about one or more unsearched areas, and obtain the grid map 1100 updated by using the obtained area information. The grid map 1100 may include searched areas 1110, 1120, and 1122 (hereinafter, also referred to as the first area 1110, and the second areas 1120 and 1122), an unsearched area 1130, and a fall point 1140. In an embodiment of the disclosure, the searched areas 1110, 1120, and 1122 may include the first area 1110, which is a free space in which no obstacle has been detected, and the second areas 1120 and 1122 in which obstacles, such as a wall, a protrusion, furniture, a home appliance, or a pet, have been detected. The fall point 1140 refers to an area lower than a living room, a master bedroom, or a secondary bedroom, for example, a balcony or a utility room, and may be detected by using a fall prevention sensor 1511 (see FIG. 15) included in the cleaning robot 100. Because the cleaning robot 100 is unable to travel through the fall point 1140, an unsearched area 1130 may exist adjacent to the fall point 1140.

The cleaning robot 100 may store the updated grid map 1100. In an embodiment of the disclosure, the processor 120 (see FIG. 2) of the cleaning robot 100 may store the updated grid map 1100 in the memory 130 (see FIG. 2). However, the disclosure is not limited thereto, and the processor 120 may store the updated grid map 1100 in a separate storage unit included in the cleaning robot 100 or a web-based database.

In an embodiment of the disclosure, the processor 120 may identify, by using SLAM technology, the current location of the cleaning robot 100 moving on the grid map 1100. Even after storing the grid map 1100, the processor 120 may again store the grid map 1100 when a distance Δd between the location of the cleaning robot 100 and a charging station 160 is within a threshold distance. For example, the threshold distance may be a distance at which the cleaning robot 100 attempts docking by detecting an infrared signal transmitted from the charging station 160, but is not limited thereto. The processor 120 may update the grid map 1100 by using area information obtained while moving to a location adjacent to the charging station 160, and finally store the grid map 1100 to reflect updated details. Continuing to make observations and updates to the grid map 1100 while traveling in previously searched areas, such as the first area 1110, can result in detecting changes. For example, if an obstacle is a pet, the pet may have moved to a different location. Further, a human may have intervened to pick up or move a previously detected obstacle. Additionally, a new obstacle may appear, such as a dropped item.

Figure 12:
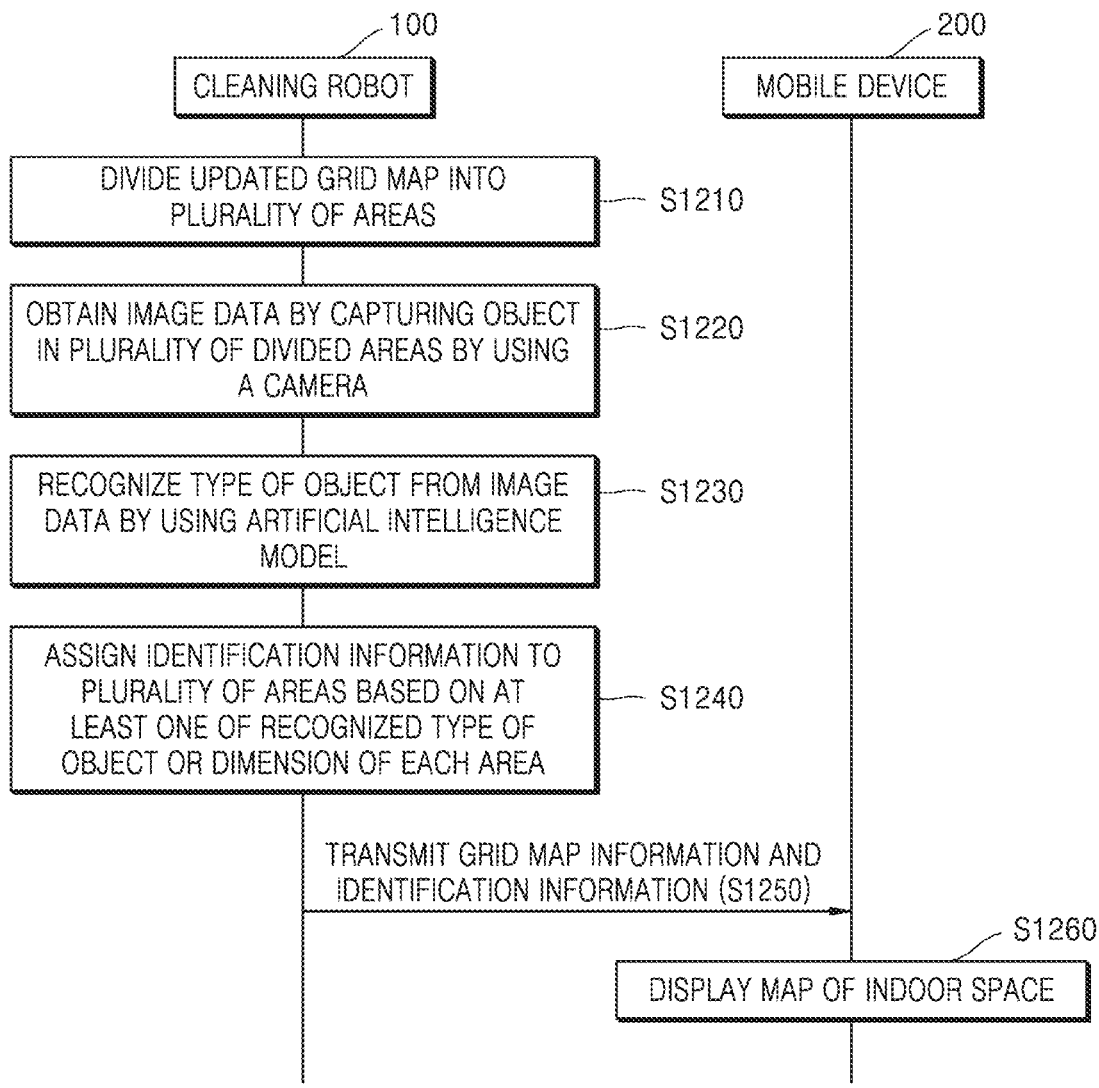
FIG. 12 is a flowchart illustrating operations of a cleaning robot and a mobile device, according to an embodiment of the disclosure.

FIG. 12 is a flowchart illustrating operations of the cleaning robot 100 and a mobile device 200, according to an embodiment of the disclosure.

Referring to FIG. 12, the cleaning robot 100 may be connected to the mobile device 200 through a wired/wireless communication network. The mobile device 200 may, through a certain application installed therein, transmit and receive data to and from the cleaning robot 100 and control an operation of the cleaning robot 100. In an embodiment of the disclosure, the certain application may be an application that provides a function of displaying a map of an indoor space of the cleaning robot 100, receiving a user input for determining a cleaning target area through the map, or remotely controlling a cleaning operation of the cleaning robot 100.

In an embodiment of the disclosure, the mobile device 200 may be a device connected to the cleaning robot 100 with the same user account. The mobile device 200 may be directly connected to the cleaning robot 100 through a short-range communication link, or may be indirectly connected to the cleaning robot 100 through a server. The mobile device 200 may be connected to the cleaning robot 100 or the server by using, for example, at least one data communication network of a wireless local area network (LAN), Wi-Fi, Bluetooth, Zigbee, Wi-Fi Direct (WFD), Bluetooth Low Energy (BLE), wireless broadband internet (WiBro), Worldwide Interoperability for Microwave Access (WiMAX), shared wireless access protocol (SWAP), Wireless Gigabit Allicance (WiGig), or radio frequency (RF) communication, and perform data transmission and reception.

In an embodiment of the disclosure, the mobile device 200 may be implemented in various forms. For example, the mobile device 200 may be any one of a smart phone, a tablet personal computer (PC), a laptop computer, a digital camera, an electronic book terminal, a digital broadcast terminal, a personal digital assistant (PDA), a portable multimedia player (PMP), a navigation system, or an MP3 player, but is not limited thereto. In an embodiment of the disclosure, the mobile device 200 may be a wearable device. The wearable device may include at least one of an accessory-type device (e.g., a watch, a ring, a cuff band, an ankle band, a necklace, spectacles, and a contact lens), a head-mounted device (HMD), a textile or garment-integrated device (e.g. electronic garments), a body attachment device (e.g., a skin pad), or a bioimplantable device (e.g., an implantable circuit).

In operation S1210, the cleaning robot 100 divides an updated grid map into a plurality of areas. In an embodiment of the disclosure, the cleaning robot 100 may divide an area in the grid map into a plurality of areas based on information about at least one of the structure, shape, or an obstacle of the area included in the grid map. For example, the cleaning robot 100 may divide the area included in the grid map into the plurality of areas by using information about a shape (e.g., a rectangle or a square), a wall structure, or an obstacle in the grid map.

In operation S1220, the cleaning robot 100 obtains image data about an object in the plurality of areas by capturing the divided indoor space by using a camera. In an embodiment of the disclosure, the cleaning robot 100 may capture at least one object in the indoor space by using the camera while traveling through the indoor space. The cleaning robot 100 may identify which of the plurality of areas on the grid map corresponds to the location of the cleaning robot 100 in the indoor space and the location of the captured object, for instance, by using SLAM technology.

In operation S1230, the cleaning robot 100 may recognize the type of the object from the image data by using an AI model. In an embodiment of the disclosure, the cleaning robot 100 may infer the type of the object from the image data by using a deep learning-based artificial neural network (ANN). Deep learning is an AI technology for allowing a computer to learn like a human without being taught by a human, by using a method of training a computer to think like a human based on an artificial neural network for configuring AI. In an embodiment of the disclosure, the cleaning robot 100 may include a deep neural network model configured with model parameters trained by applying thousands or tens of thousands of images as input data and applying label values of objects included in the images as output answer values (e.g., ground truth). The deep neural network model may include, for example, at least one of a convolutional neural network (CNN), a recurrent neural network (RNN), a restricted Boltzmann Machine (RBM), a deep belief network (DBN), a bidirectional recurrent DNN (BRDNN), or a deep Q-network. However, the deep neural network model is not limited to the above examples.

In an embodiment of the disclosure, the cleaning robot 100 may input the image data about the indoor space captured by using the camera into the deep neural network model, and recognize the type of an object included in the image data through inference using the deep neural network model.

In operation S1240, the cleaning robot 100 assigns identification information to the plurality of areas based on at least one of the recognized type of the object or the dimension of each area. The 'identification information' is information indicating the structure or purpose of an indoor space, and may include, for example, 'living room', 'kitchen', 'bedroom', 'front door', etc. In an embodiment of the disclosure, the cleaning robot 100 may store information about a mapping relationship between the type of an object and identification information. For example, when the recognized object is a 'refrigerator', the object may be mapped to 'kitchen', and when the recognized object is a 'bed', the object may be mapped to 'master bedroom'. The cleaning robot 100 may assign identification information to the plurality of areas by using information about pre-stored mapping relationships. For example, when the object recognized in operation S1230 is a home appliance used in a kitchen, such as a refrigerator, identification information of 'kitchen' may be assigned to the corresponding area. As another example, when the recognized object is furniture used in a room such as a bed, the cleaning robot 100 may assign identification information of 'bedroom' or 'room 1'.

In an embodiment of the disclosure, the cleaning robot 100 may assign the identification information to the plurality of areas based on not only the type of the recognized object but also the size of the area. For example, even when the object recognized from the image data is a bed, identification information of 'bedroom' may be assigned to an area having a larger dimension, and identification information of 'room 1' or 'room 2' may be assigned to an area having a relatively smaller dimension.

In operation S1250, the cleaning robot 100 transmits grid map information and the identification information to the mobile device 200. The cleaning robot 100 may transmit the grid map information and the identification information to the mobile device 200 directly or through the server.

In operation S1260, the mobile device 200 displays a map of the indoor space. In an embodiment of the disclosure, the mobile device 200 may display, through an executed application, the map of the indoor space by using the grid map information and the identification information. In this case, the identification information may be displayed for each area on the map of the indoor space.

FIG. 13 is a diagram illustrating an operation, performed by the cleaning robot 100, recognizing an object in an indoor space, according to an embodiment of the disclosure.

Referring to FIG. 13, the cleaning robot 100 may further include a camera 150, in addition to the sensor module 110 (see FIG. 2), the processor 120, the memory 130 (see FIG. 2), and the moving assembly 140 (see FIG. 2) illustrated in FIG. 2.

The camera 150 may include an image sensor (e.g., a complementary metal-oxide-semiconductor (CMOS) image sensor) including at least one optical lens and a plurality of photodiodes (e.g., pixels) on which an image is formed by light having passed through the optical lens, and a digital signal processor (DSP) for configuring an image based on a signal output from the photodiodes. In an embodiment of the disclosure, the camera 150 may obtain image data about at least one object in the indoor space by capturing an image of the indoor space. The camera 150 may provide the image data to an AI model 132 as input data.

The AI model 132 may include a deep neural network model trained to recognize the type of an object or obstacle in the indoor space from the image data which is input from the camera 150. The AI model 132 may be stored in the memory 130 of the cleaning robot 100, but is not limited thereto. In an embodiment of the disclosure, the AI model 132 may be stored in the server, and the cleaning robot 100 may transmit the image data to the server and receive, from the AI model 132 of the server, information about the type of the object, which is a result of inference.

The AI model 132 may include a deep neural network model configured with model parameters trained by applying thousands or tens of thousands of images as input data and applying label values of objects included in the images as output answer values (e.g., ground truth). The deep neural network model may include, for example, at least one of a CNN, an RNN, an RBM, a DBN, a BRDNN, or a deep Q-network. However, the deep neural network model is not limited to the above examples.

For example, in the case where the deep neural network model is a CNN model, the AI model 132 may include model parameter values including weights and biases between layers, which are obtained as a result of training. Further, the AI model 132 can include multiple convolution layers, pooling layers, and at least one hidden layer, where the convolution layers can alternate with the pooling layers.

The processor 120 may include an AI processor. The AI processor may be configured in the form of a dedicated hardware chip for AI, and may be included in the processor 120 as part of a general-purpose processor (e.g., a CPU or an application processor) or a dedicated graphics processor (e.g., a GPU). The AI processor may obtain information about the type of the object from the image data by using the AI model 132.

The AI model 132 may output an object recognition result. In an embodiment of the disclosure, the object recognition result may include at least one label value with respect to the type of the object inferred from the input image data and a confidence level with respect to the at least one label value. Here, the 'confidence level' refers to a probability of the type of the object being inferred as a certain type from the image data. The AI processor may obtain the information about the type of the object based on the label value and the confidence level output by the AI model 132.

The processor 120 may assign identification information to a plurality of areas in the indoor space, based on at least one of the type of the object obtained as a result of object recognition and the size of each area. A detailed method of assigning the identification information to the plurality of areas is the same as operation S1240 of FIG. 12, a duplicate description will be omitted.

Figure 14:
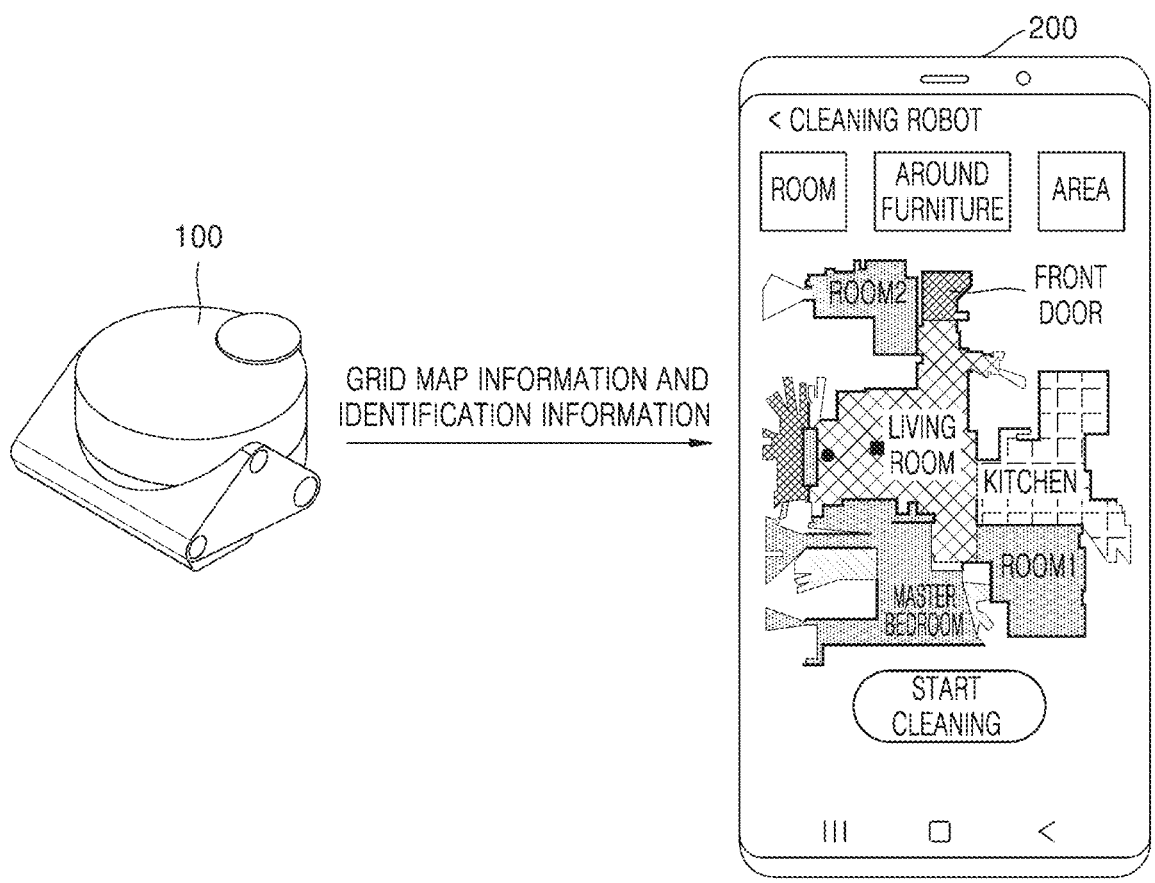
FIG. 14 is a diagram illustrating operations of a cleaning robot and a mobile device, according to an embodiment of the disclosure.

FIG. 14 is a diagram illustrating operations of the cleaning robot 100 and the mobile device 200, according to an embodiment of the disclosure.

Referring to FIG. 14, the cleaning robot 100 may divide a map of an indoor space into a plurality of areas, and may assign identification information to each of the plurality of areas. In an embodiment of the disclosure, the cleaning robot 100 may assign the identification information to the plurality of areas in the map of the indoor space, based on at least one of the types of objects recognized in the plurality of areas or the dimension of each area. For example, when an object recognized in a certain area of the indoor space is a home appliance used in a kitchen, such as a refrigerator, the cleaning robot 100 may assign identification information of 'kitchen' to the corresponding area. As another example, when an object recognized in a certain area in the indoor space is furniture used in a room, such as a bed, the cleaning robot 100 may assign identification information of 'bedroom' or 'room 1' to the corresponding area.

In an embodiment of the disclosure, the cleaning robot 100 may assign the identification information to the plurality of areas, based on not only the type of a recognized object but also the size of each area. For example, even when an object recognized from image data is a bed, identification information of 'master bedroom' may be assigned to an area having a larger dimension, and identification information of 'room 1' or 'room 2' may be assigned to an area having a relatively smaller dimension.

The cleaning robot 100 may transmit, to the mobile device 200, updated grid map information and the identification information assigned to the plurality of areas. For example, the cleaning robot 100 may transmit the grid map information and the identification information to the mobile device 200 by using, for example, at least one data communication network of a wireless LAN, Wi-Fi, Bluetooth, Zigbee, WFD, BLE, WiBro, WiMAX, SWAP, WiGig, or RF communication.

The mobile device 200 may display the map of the indoor space by using the grid map information and the identification information received from the cleaning robot 100. The mobile device 200 may display the map of the indoor space through an application capable of controlling an operation of the cleaning robot 100. In the map displayed through the mobile device 200, the indoor space may be divided into the plurality of areas, and the identification information, such as 'living room', 'kitchen', master 'bedroom', 'room 1', or 'room 2' may be displayed with respect to each of the plurality of areas.

The cleaning robot 100 according to the embodiment illustrated in FIG. 14 displays the indoor space divided into the plurality of areas through the mobile device 200 and displays the identification information about the plurality of areas, to provide a technical effect of allowing a user to grasp the indoor space more intuitively through the map. In addition, the user may clean only a certain area of the plurality of areas by using the mobile device 200 and may check which area the cleaning robot 100 is currently located, and thus user convenience may be improved.

Figure 15:
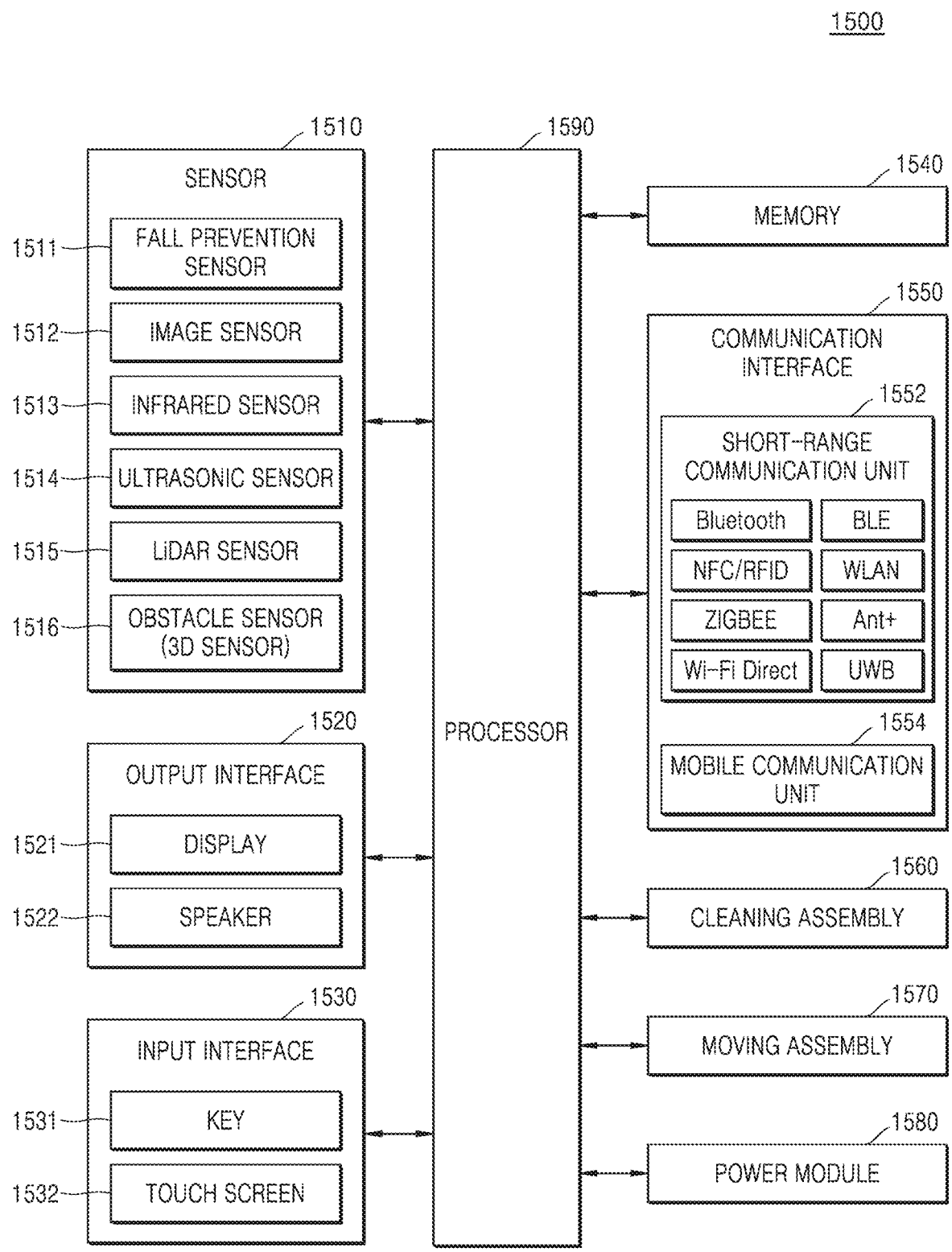
FIG. 15 is a block diagram illustrating components of a cleaning robot, according to an embodiment of the disclosure.

FIG. 15 is a block diagram illustrating components of a cleaning robot 1500, according to an embodiment of the disclosure.

Referring to FIG. 15, the cleaning robot 1500 may include a sensor 1510, an output interface 1520, an input interface 1530, a memory 1540, a communication interface 1550, a cleaning assembly 1560, a moving assembly 1570, a power module 1580, and a processor 1590. The cleaning robot 1500 may be configured by various combinations of the components illustrated in FIG. 15, and the components illustrated in FIG. 15 are not essential components.

The cleaning robot 1500 illustrated in FIG. 15 may correspond to the cleaning robot 100 described with reference to FIG. 2, the processor 1590 may correspond to the processor 120 described with reference to FIG. 2, the memory 1540 may correspond to the memory 130 described with reference to FIG. 2, and the moving assembly 1570 may correspond to the moving assembly 140 described with reference to FIG. 2. An image sensor 1512 illustrated in FIG. 15 may correspond to the camera 150 described with reference to FIG. 13.

The sensor 1510 may include various types of sensors, for example, at least one of the fall prevention sensor 1511, the image sensor 1512, an infrared sensor 1513, an ultrasonic sensor 1514, a LiDAR sensor 1515, an obstacle sensor 1516, and a mileage sensor (not shown), or a combination thereof. The mileage sensor may include a rotation detection sensor configured to calculate the number of rotations of a wheel, such as an odometer. For example, the rotation detection sensor may include an encoder installed to detect the number of rotations of a motor. A plurality of image sensors 1512 may be arranged in the cleaning robot 1500 according to an implementation. A function of each sensor may be intuitively deduced from the name by one of ordinary skill in the art, and thus a detailed description thereof is omitted.

The output interface 1520 may include at least one of a display 1521 or a speaker 1522, or a combination thereof. The output interface 1520 outputs various notifications, messages, information, and the like generated by the processor 1590.

The input interface 1530 may include a key 1531, a touch screen 1532, a touch pad, and the like. The input interface 1530 receives a user input and transmits the user input to the processor 1590. The key 1531 can include any type of button, switch, dial, or knob.

The memory 1540 stores various information, data, instructions, programs, and the like necessary for the operation of the cleaning robot 1500. The memory 1540 may include at least one of a volatile memory or a non-volatile memory, or a combination thereof. The memory 1540 may include at least one of a flash memory-type storage medium, a hard disk-type storage medium, a multimedia card micro-type storage medium, a card-type memory (e.g., an SD or XD memory), RAM, SRAM, ROM, EEPROM, PROM, a magnetic memory, a magnetic disc, or an optical disc. Also, the cleaning robot 1500 may operate a web storage or a cloud server that performs a storage function on the Internet or other such network.

The communication interface 1550 may include at least one of a short-range wireless communication unit 1552 or a mobile communication unit 1554, or a combination thereof. The communication interface 1550 may include at least one antenna for wirelessly communicating with another device.

The short-range wireless communication unit 1552 may include, but is not limited to, a Bluetooth communication unit, a BLE communication unit, a near-field communication (NFC) unit, a wireless LAN (WLAN) (Wi-Fi) communication unit, a Zigbee communication unit, an Infrared Data Association (IrDA) communication unit, a WFD communication unit, an ultra-wideband (UWB) communication unit, an Ant+ communication unit, a microwave (uWave) communication unit, etc.

The mobile communication unit 1554 transmits and receives a wireless signal to and from at least one of a base station, an external terminal, or a server, on a mobile communication network. Here, the wireless signal may include various types of data according to transmission and reception of voice call signals, video call signals, or text/multimedia messages.

The cleaning assembly 1560 may include a main brush assembly installed at the bottom of the main body to sweep or scatter dust on a floor and suck up the swept or scattered dust, and a side brush assembly installed at the bottom of the main body and protruding toward the outside to sweep dust on areas other than an area being cleaned by the main brush assembly and transfer the swept dust to the main brush assembly. Also, the cleaning assembly 1560 may include a vacuum cleaning module for performing vacuum suction or a wet-mop cleaning module for performing wet-mop cleaning.

The moving assembly 1570 moves the main body of the cleaning robot 1500. The moving assembly may include a pair of wheels (e.g., two or more wheels) that allow the cleaning robot 1500 to move forward and backward, and rotate, a wheel motor that applies a moving force to at least one of the wheels, a caster wheel that is installed in front of the main body to rotate according to the state of a floor surface on which the cleaning robot 1500 moves, and thus change the angle of the cleaning robot 1500, and the like. The moving assembly 1570 moves the cleaning robot 1500 under the control by the processor 1590. The processor 1590 determines a travel path and controls the moving assembly 1570 to move the cleaning robot 1500 to the determined travel path.

The power module 1580 supplies power to the cleaning robot 1500. The power module 1580 includes a battery, a power driving circuit, a converter, a transformer circuit, and the like. The power module 1580 connects to a charging station (e.g., charging station 160 of FIG. 11) to charge the battery, and supplies power charged in the battery to the components of the cleaning robot 1500.

The processor 1590 controls the overall operation of the cleaning robot 1500. The processor 1590 may execute a program stored in the memory 1540 to control the components of the cleaning robot 1500.

According to an embodiment of the disclosure, the processor 1590 may include a separate neural processing unit (NPU) that performs an operation of a machine learning model. In addition, the processor 1590 may include a CPU, a GPU, and the like.

The processor 1590 may perform operations of the cleaning robot 1500, such as controlling an operation mode, determining and controlling a travel path, recognizing an obstacle, controlling a cleaning operation, recognizing a location, communicating with an external server, monitoring a remaining battery capacity, controlling a battery charging operation, and the like.

The term 'module' used in various embodiments of the disclosure may include a unit implemented in hardware, software, or firmware, and may be used interchangeably with terms such as 'logic', 'logic block', 'part', or 'circuitry'. A module may be a single integral component, or a minimum unit or part thereof, adapted to perform one or more functions. For example, according to an embodiment of the disclosure, a module may be implemented in the form of an ASIC.

A program executable by the cleaning robot 1500 described herein may be implemented as a hardware component, a software component, and/or a combination of hardware components and software components. The program may be executed by any system capable of executing computer-readable instructions.

Software may include a computer program, code, instructions, or a combination of one or more thereof, and may configure or instruct individually or collectively a processing device to operate in a preferred manner.

The software may be implemented as a computer program that includes instructions stored in computer-readable storage media. The computer-readable storage media may include, for example, magnetic storage media (e.g., ROM, RAM, floppy disks, hard disks, etc.) and optical storage media (e.g., compact disk ROM (CD-ROM), digital versatile disc (DVD), etc.). The computer-readable storage media may be distributed in computer systems connected via a network and may store and execute computer-readable code in a distributed manner. The media may be computer-readable, may be stored in a memory, and may be executed by a processor.

The computer-readable storage medium may be provided in the form of a non-transitory storage medium. Here, the term 'non-transitory' simply means that the storage medium is a tangible device, and does not include a signal, but this term does not differentiate between where data is semi-permanently stored in the storage medium and where the data is temporarily stored in the storage medium. For example, the non-transitory storage medium may include a buffer in which data is temporarily stored.

In addition, a program according to embodiments of the disclosure may be provided in a computer program product. The computer program product may be traded between a seller and a purchaser as a commodity.

The computer program product may include a software program and a computer-readable storage medium having recorded thereon the software program. For example, the computer program product may include a product (e.g., a downloadable application) in the form of a software program electronically distributed through a manufacturer of the cleaning robot 100 or an electronic market (e.g., Samsung Galaxy Store). For the electronic distribution, at least part of the software program may be stored in a storage medium or temporarily generated. In this case, the storage medium may be a storage medium of a server of the manufacturer of the cleaning robot 100 or a server of the electronic market, or a relay server that temporarily stores the software program.

The computer program product may include a storage medium of a server or a storage medium of an electronic device, in a system consisting of the cleaning robot 100, the mobile device 200, and/or a server. Alternatively, when there is a third device (e.g., the mobile device 200) communicatively connected to the cleaning robot 100, the computer program product may include a storage medium of the third device. Alternatively, the computer program product may include the software program itself, which is transmitted from the cleaning robot 100 to an electronic device or a third device or transmitted from the third device to the electronic device.

In this case, one of the cleaning robot 100, the mobile device 200, and the third device may execute the computer program product to perform the method according to the embodiments of the disclosure. Alternatively, two or more of the cleaning robot 100, the mobile device 200, and the third device may execute the computer program product to execute the method according to the embodiments of the disclosure in a distributed manner.

For example, the cleaning robot 100 may execute the computer program product stored in the memory 130 (see FIG. 2) to control another electronic device (e.g., a mobile device) communicatively connected to the cleaning robot 100 to perform the method according to embodiments of the disclosure.

As another example, a third device may execute the computer program product to control an electronic device communicatively connected to the third device to perform the method according to embodiments of the disclosure.

In the case where the third device executes the computer program product, the third device may download the computer program product from the cleaning robot 100 and execute the downloaded computer program product. Alternatively, the third device may execute the computer program product provided in a pre-loaded state to execute the method according to embodiments of the disclosure.

Although the embodiments of the disclosure have been described with the limited embodiments and the drawings, various modifications and changes may be made by those of skill in the art from the above description. For example, suitable results may be obtained even when the described techniques are performed in a different order, or when components in a described electronic device, architecture, device, or circuit are coupled or combined in a different manner, or replaced or supplemented by other components or their equivalents.

The invention claimed is:

1. A method, performed by a cleaning robot, of obtaining a map of an indoor space, the method comprising:
    searching the indoor space at a first location of the cleaning robot by using at least one sensor of the cleaning robot;
    obtaining a grid map comprising a searched area, which has been searched at the first location, and at least one unsearched area, which has not been searched at the first location;
    detecting a first unsearched area from among the at least one unsearched area at a shortest distance from the first location;
    detecting, by using an obstacle detection sensor, a plurality of obstacles around the first unsearched area;
    determining, as a travel destination, based on a result of comparing a distance between the plurality of obstacles and a width of the cleaning robot, the first unsearched area among the at least one unsearched area;
    obtaining area information comprising at least one of geometry information, structure information, or obstacle information about the first unsearched area while moving the cleaning robot from the first location to the first unsearched area;
    updating the grid map by using the obtained area information; and
    storing, in a memory of the cleaning robot, the updated grid map when the cleaning robot approaches a charging station within a preset threshold distance.

2. The method of claim 1, wherein the determining of the first unsearched area as the travel destination comprises:
    comparing a distance between a plurality of obstacles around a location of the first unsearched area with a width of the cleaning robot; and
    determining the first unsearched area as the travel destination, when the distance between the obstacles is greater than the width of the cleaning robot based on a result of the comparing.

3. The method of claim 1, further comprising determining a moving path for moving the cleaning robot from the first location to a location of the first unsearched area.

4. The method of claim 3, further comprising:
    obtaining information about at least one via point, which is passed through in moving the cleaning robot along the moving path; and
    optimizing the moving path by merging or deleting the at least one via point based on a shortest distance between the first location and the location of the first unsearched area and location information of an obstacle adjacent to a line indicating the shortest distance.

5. The method of claim 1, further comprising, after moving the cleaning robot to the first unsearched area, detecting, as a second travel destination, a second unsearched area among the at least one unsearched area included in the updated grid map by analyzing a surrounding area based on a location of the first unsearched area on the updated grid map.

6. The method of claim 1, wherein the updating of the grid map comprises:
    moving the cleaning robot to a second location, which is at one via point among a plurality of via points included in a moving path for moving the cleaning robot to a location of the first unsearched area;
    updating the grid map based on information obtained while moving the cleaning robot to the second location; and
    determining a second unsearched area as a second travel destination by analyzing a surrounding area based on the second location on the updated grid map.

7. The method of claim 1, wherein the preset threshold distance comprises a distance at which the cleaning robot detects a docking signal of the charging station that initiates attempted docking of the cleaning robot.

8. A cleaning robot for obtaining a map of an indoor space, the cleaning robot comprising:
    a sensor module comprising at least one of a light detection and ranging sensor or an obstacle detection sensor;
    a moving assembly configured to move the cleaning robot;
    a memory which stores at least one instruction; and
    at least one processor configured to execute the at least one instruction to
        search the indoor space at a first location of the cleaning robot by using the sensor module,
        obtain a grid map comprising a searched area, which has been searched at the first location, and at least one unsearched area, which has not been searched at the first location,
        detect a first unsearched area from among the at least one unsearched area at a shortest distance from the first location,
        detect, by using the obstacle detection sensor, a plurality of obstacles around the at least one unsearched area,
        determine, as a travel destination, the first unsearched area among the at least one unsearched area based on a result of comparing a distance between the plurality of obstacles and a width of the cleaning robot, control the moving assembly to move the cleaning robot toward the first unsearched area, obtain area information comprising at least one of location information, structure information, or obstacle information about the first unsearched area, update the grid map by using the obtained area information, and store, in the memory of the cleaning robot, the updated grid map when the cleaning robot approaches a charging station within a preset threshold distance.

9. The cleaning robot of claim 8, wherein the at least one processor is further configured to execute the at least one instruction to compare a distance between a plurality of obstacles around a location of the first unsearched area with a width of the cleaning robot, determine the first unsearched area as the travel destination, when the distance between the obstacles is greater than the width of the cleaning robot based on a result of the comparing, and control the moving assembly to move the cleaning robot to the determined first travel destination.

10. The cleaning robot of claim 8, wherein the at least one processor is further configured to execute the at least one instruction to determine a moving path for moving the cleaning robot from the first location to a location of the first unsearched area.

11. The cleaning robot of claim 10, wherein the at least one processor is further configured to execute the at least one instruction to obtain information about at least one via point, which is passed through in moving the cleaning robot along the moving path, and optimize the moving path by merging or deleting the at least one via point based on a shortest distance between the first location and the location of the first unsearched area and location information of an obstacle adjacent to a line indicating the shortest distance.

12. The cleaning robot of claim 8, wherein the at least one processor is further configured to execute the at least one instruction to, after moving the cleaning robot to the first unsearched area, detect a second unsearched area among the at least one unsearched area included in the updated grid map by analyzing a surrounding area based on a location of the first unsearched area on the updated grid map.

13. The cleaning robot of claim 8, wherein the at least one processor is further configured to execute the at least one instruction to control the moving assembly to move the cleaning robot to a second location, which is at one via point among a plurality of via points included in a moving path for moving the cleaning robot to a location of the first unsearched area, update the grid map based on information obtained while moving the cleaning robot to the second location, and detect a second unsearched area by searching a surrounding area based on the second location on the updated grid map by using the sensor module.

14. The cleaning robot of claim 8, wherein the preset threshold distance comprises a distance at which the cleaning robot detects a docking signal of the charging station that initiates attempted docking of the cleaning robot.

15. A non-transitory computer program product comprising a computer-readable recording medium, the computer-readable recording medium comprising instructions which are readable by at least one processor of a cleaning robot to cause the cleaning robot to:

search an indoor space at a first location of the cleaning robot by using at least one sensor of the cleaning robot;

obtain a grid map comprising a searched area, which has been searched at the first location, and at least one unsearched area, which has not been searched at the first location;

detect a first unsearched area from among the at least one unsearched area at a shortest distance from the first location;

detect, by using an obstacle detection sensor, a plurality of obstacles around the at least one unsearched area;

determine, as a travel destination, based on a result of comparing a distance between the plurality of obstacles and a width of the cleaning robot, the first unsearched area among the at least one unsearched area;

obtain area information comprising at least one of geometry information, structure information, or obstacle information about the first unsearched area while moving the cleaning robot from the first location to the first unsearched area; and update the grid map by using the obtained area information; and store, in a memory of the cleaning robot, the updated grid map when the cleaning robot approaches a charging station within a preset threshold distance.

16. The method of claim 1, wherein the detecting of the first unsearched area comprises detecting the first unsearched area by performing an analysis using a breadth-first search scheme in four directions or eight directions based on the first location on the grid map.

17. The computer program product of claim 15, wherein the preset threshold distance comprises a distance at which the cleaning robot detects a docking signal of the charging station that initiates attempted docking of the cleaning robot.

18. The method of claim 1, further comprising:

dividing the updated grid map into a plurality of areas; and assigning identification information about the plurality of areas based on at least one of a type of an object recognized in the plurality of areas or dimensions of the plurality of areas.

19. The cleaning robot of claim 8, wherein the at least one processor is further configured to execute the at least one instruction to control the sensor module to perform an analysis using a breadth-first search scheme in four directions or eight directions based on the first location, and detect the first unsearched area which has not been searched by the sensor module.

\* \* \* \* \*